(12) United States Patent
Wisoff

(10) Patent No.: US 12,462,096 B2
(45) Date of Patent: Nov. 4, 2025

(54) GENERATING FIELD OBJECTS FOR AUTO-POPULATING FILLABLE DOCUMENTS UTILIZING A LARGE LANGUAGE MODEL

(71) Applicant: Dropbox, Inc., San Francisco, CA (US)

(72) Inventor: Charles Wisoff, Albuquerque, NM (US)

(73) Assignee: Dropbox, Inc., San Francisco, CA (US)

( * ) Notice: Subject to any disclaimer, the term of this patent is extended or adjusted under 35 U.S.C. 154(b) by 154 days.

(21) Appl. No.: 18/474,998

(22) Filed: Sep. 26, 2023

(65) Prior Publication Data

US 2025/0103797 A1 Mar. 27, 2025

(51) Int. Cl.
*G06F 17/00* (2019.01)
*G06F 8/35* (2018.01)
*G06F 16/34* (2019.01)
*G06F 40/174* (2020.01)
*G06F 40/30* (2020.01)

(52) U.S. Cl.
CPC .............. *G06F 40/174* (2020.01); *G06F 8/35* (2013.01); *G06F 16/345* (2019.01); *G06F 40/30* (2020.01)

(58) Field of Classification Search
CPC ........ G06F 40/174; G06F 40/30; G06F 40/56; G06F 16/345; G06F 8/35
See application file for complete search history.

(56) References Cited

U.S. PATENT DOCUMENTS

| | | | |
|---|---|---|---|
| 7,343,552 B2 * | 3/2008 | Denoue ................. | G06F 40/169 715/230 |
| 10,013,721 B1 | 7/2018 | Laaser et al. | |
| 10,915,972 B1 | 2/2021 | Goldman et al. | |
| 11,222,167 B2 * | 1/2022 | Gehrmann ............ | G06F 3/0482 |
| 11,361,025 B2 * | 6/2022 | Nguyen ................ | G06F 40/174 |
| 11,762,875 B2 * | 9/2023 | Nordell-Markovits | ...................... G06N 3/08 707/722 |
| 11,861,298 B1 * | 1/2024 | Tackie ................... | G06N 20/20 |
| 11,900,071 B2 * | 2/2024 | Paul ....................... | G06F 40/56 |
| 11,989,507 B2 * | 5/2024 | Tunstall-Pedoe ....... | G06F 40/20 |
| 12,067,039 B1 * | 8/2024 | Campos ................ | G06V 30/412 |
| 12,118,290 B2 * | 10/2024 | Mason .................. | G06F 40/186 |
| 12,124,796 B2 * | 10/2024 | Gadiya ................. | G06V 30/418 |
| 12,340,319 B2 * | 6/2025 | Broyles ................ | G06F 16/2379 |
| 2005/0198563 A1 | 9/2005 | Kristjansson | |

(Continued)

FOREIGN PATENT DOCUMENTS

WO WO-2024218839 A1 * 10/2024 ......... G06F 16/3329

*Primary Examiner* — Laurie A Ries
(74) *Attorney, Agent, or Firm* — Keller Preece PLLC

(57) ABSTRACT

The present disclosure relates to systems, non-transitory computer-readable media, and methods for modifying a fillable digital document. In particular, the disclosed systems can receive a user interaction requesting to populate one or more aggregated data fields in a fillable digital document. In response to the request, the field object generation system can determine the data relevant to one or more aggregated data fields in the fillable digital document by utilizing a large language model to process one or more source content items for a user account. Further the systems and generate a field object from the data relevant to one or more aggregated data field and modify the fillable digital document by including the field object in the fillable digital document.

20 Claims, 11 Drawing Sheets

(56) References Cited

U.S. PATENT DOCUMENTS

| | | | |
|---|---|---|---|
| 2015/0033116 A1* | 1/2015 | McKinney | G06F 40/258 |
| | | | 715/239 |
| 2017/0223001 A1 | 8/2017 | Haddad et al. | |
| 2018/0018311 A1 | 1/2018 | Mukherjee et al. | |
| 2018/0039610 A1* | 2/2018 | Litvak | G06F 40/274 |
| 2018/0075202 A1 | 3/2018 | Davis et al. | |
| 2019/0155892 A1 | 5/2019 | Dakin et al. | |
| 2019/0197184 A1* | 6/2019 | Srinivasan | G06F 16/338 |
| 2020/0057801 A1* | 2/2020 | Roy | G06V 30/418 |
| 2020/0210383 A1 | 7/2020 | DeMaris et al. | |
| 2021/0192126 A1* | 6/2021 | Gehrmann | G06N 20/00 |
| 2021/0350088 A1* | 11/2021 | Ravi | G06F 40/284 |
| 2021/0374360 A1* | 12/2021 | Paul | G06F 40/56 |
| 2022/0058172 A1 | 2/2022 | John et al. | |
| 2023/0039971 A1 | 2/2023 | Zheng et al. | |
| 2023/0063052 A1* | 3/2023 | Sohail | G06Q 30/0639 |
| 2023/0259701 A1 | 8/2023 | Kite et al. | |
| 2023/0316008 A1* | 10/2023 | Vlad | G06N 3/08 |
| | | | 704/2 |
| 2024/0331229 A1* | 10/2024 | Judd | G06T 11/60 |
| 2024/0370709 A1* | 11/2024 | Siebel | G06N 3/047 |
| 2024/0370827 A1* | 11/2024 | Zionpour | G06F 40/166 |
| 2024/0403545 A1* | 12/2024 | Nahum | G06F 3/0481 |
| 2025/0061141 A1* | 2/2025 | Neervannan | G06F 16/3344 |

\* cited by examiner

GENERATING FIELD OBJECTS FOR AUTO-POPULATING FILLABLE DOCUMENTS UTILIZING A LARGE LANGUAGE MODEL

BACKGROUND

Recent years have seen significant developments in automated digital form filling systems. For example, some existing form filling systems can provide tools for generating digital signatures, typing text, and/or inserting images within fillable digital documents. Some systems have even developed that implement predictive machine learning techniques to determine fillable locations within a digital document that are not predefined as fillable. Despite these advances, some existing systems exhibit a number of problems in relation to accuracy and efficiency.

As just mentioned, many existing systems are inaccurate. Specifically, existing systems often generate inaccurate content for inserting into a fillable digital document. Even systems that implement machine learning techniques as part of digital document form filling generate inaccurate content for fillable fields due to their overgeneralized training. In many existing systems, machine learning models are trained over enormous databases of common general data to achieve broad coverage of output generation across a wide array of contexts. Unfortunately, a consequence of such wide-ranging and generalized training is that the resulting machine learning models often hallucinate, generating erroneous or incorrect predictions (or other outputs) that the models treat as true. Without ways to remediate the inaccurate outputs generated by existing machine learning models, many conventional systems produce unreliable outputs, which negatively affect downstream analysis and/or use of such outputs.

In addition to their inaccurate analysis, existing systems suffer from navigational and computational inefficiencies. For example, some existing systems require navigation across several windows, interfaces, and/or applications to input digital content into fillable digital documents. Consequently, these existing systems require an excessive number of user interactions to access desired data and/or functionality by switching between interfaces and/or applications to select or generate content and insert the selected/generated content into each individual data field. For instance, populating data fields in some existing systems requires a first interface to access source data to insert, a second interface to combine the data, and a third interface for inserting the combined data into a fillable digital document. As a result of processing such a large number of interactions and simultaneously running multiple applications and/or browsers during data input stages, existing systems often waste computer resources that could otherwise be preserved with more efficient interfaces.

These along with additional problems and issues exist with regard to conventional large language model systems.

SUMMARY

Embodiments of the present disclosure provide benefits and/or solve one or more of the foregoing or other problems in the art with systems, non-transitory computer readable media, and methods for generating field objects to input into fillable digital documents utilizing large language models. More specifically, the disclosed systems utilize a large language model to extract, combine, and/or enter relevant data from one or more stored content sources into the input fields of a fillable digital document. For example, the disclosed systems can receive a request for populating one or more input fields in a digital document. In response to the request, the disclosed systems can access source content items and determine the relevance of information in the source content items with respect to the input fields in the digital document utilizing a large language model. For example, the disclosed systems can determine the subject matter of one or more source content items by analyzing one or more source content items with a large language model. Subsequently, the disclosed system can compare the subject matter of the source content items with the values of the input fields of the digital document. Based on the comparison the disclosed systems can determine the relevance of information in the source content items with respect to the input fields of the digital document. Once the disclosed systems determine the relevant data associated with various input fields of the digital document, the disclosed systems can generate a field object by combining the relevant information from the content sources. In some implementations, the disclosed systems can modify the digital document by populating one or more input fields with the field object.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
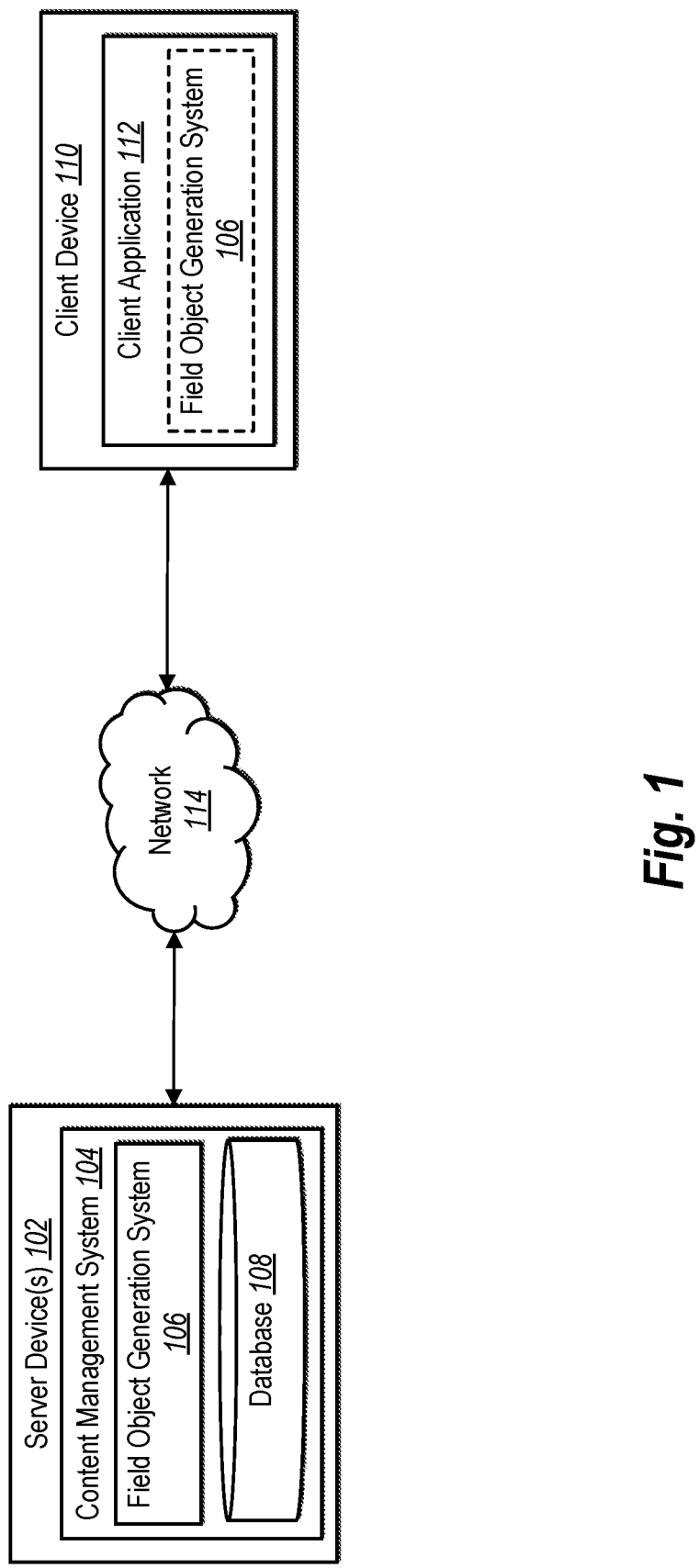
FIG. 1 illustrates a diagram of an environment in which a field object generation system can operate in accordance with one or more embodiments.

This disclosure describes one or more embodiments of a field object generation system that modifies fillable digital documents utilizing a large language model to determine data relevant to the fillable digital document. More specifically, in some embodiments, the field object generation system modifies a fillable digital document by generating a field object to insert in an aggregated data field in the fillable digital document. For instance, the field object generation system utilizes the large language model to determine the relevancy of data from one or more source content items with regard to the aggregated data fields in the fillable digital document. For example, the field object generation system can determine data relevant to the fillable digital document by creating summaries of the source content item and the aggregated data fields in the fillable digital document utilizing a content source summarization model and comparing the summaries of the source content items and aggregated data fields.

Additionally, the field object generation system can generate, utilizing the large language model, a field object from data relevant to the aggregated data field. For example, the field object generation system can generate a computer code segment that defines the data relevant to the fillable digital document and can combine the relevant data relevant together utilizing an output de-hallucination model to process the computer code segment. The field object generation system can then include or insert the field object within the fillable digital document. For example, the field object generation system can populate an aggregated data field with the field object.

The field object generation system provides a variety of technological advantages relative to conventional systems. For example, the field object generation system can improve the accuracy of generating or predicting content for data fields of fillable digital documents. Specifically, while prior systems are sometimes overly reliant on machine learning models that are trained on generalized data, the field object generation system combines data specifically relevant to fillable digital documents by using a summarization and aggregation validation approach. As opposed to existing systems whose models are prone to hallucination, especially when combining numerical data, the field object generation system can generate computer code segments using large language models to identify data from source content items, and which are executable to combine the data. By utilizing large language models to generate text-based computer code segments (which are executable to combine numerical data), in some embodiments, the field object generation system circumvents or resolves the hallucination issues that might otherwise result from implementing large language models to combine numerical data directly. Additionally, by summarizing source content items associated with a user account and by further comparing the subject matter of the summaries with subject matter of destination data fields within a fillable digital document, the field object generation system can accurately determine the relevancy of information within source content items to a destination data field within a fillable digital document, thereby preventing or reducing circumstances where data fields are populated with irrelevant data.

Additionally, the field object generation system provides improved navigational efficiency over prior systems with more efficient interfaces. For example, compared to prior systems, the field object generation system reduces the number of user interactions for accessing desired data and/or functionality in generating and inserting digital content within data fields of fillable digital documents. Specifically, while some prior systems require multiple interfaces or applications to access content items, combine data from the content items, and input combined data into data fields of a fillable digital document, the field object generation system automatically populates a fillable digital document within a single interface of a single application. In some embodiments, the field object generation system converts content items stored for a user account to text representations, extracts summaries of information from the text representations of the source content items, determines which data is relevant with regard to a data field of the fillable document, combines the relevant data into a field object, and inserts the field object into the data field-all based on a single user interaction requesting the population of fields in a fillable digital document. Thus, rather than requiring input from a client device selecting or specifying particular source content items and/or portions of source content items to provide to a model, then copying and pasting text into a large language model interface, the field object generation system can use a large language model to automatically process content items to determine, extract, and combine relevant portions of data. The field object generation system thus reduces the number of client device interactions for accessing and/or generating desired data when compared with some prior systems. Additionally, by requiring only a single interface for populating data fields, the field object generation system further reduces (or preserves for other use) the expenditure of computer resources that, in prior systems, are dedicated to opening and running multiple interfaces or applications.

As illustrated by the foregoing discussion, the present disclosure utilizes a variety of terms to describe features and advantages of the field object generation system. Additional detail is now provided regarding the meaning of such terms. For example, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Along these lines, the term "source content item" refers to a content item that provides data for generating one or more field objects. For example, a source content item includes digital content used as a source for combining with data from one or more other source content items to generate a field object for filling a data field of a fillable digital document. In some cases, a source content items refers to a stored digital document that includes numerical data reflecting financial information for filling data fields of digital tax forms.

Further, as used herein, the term "large language model" refers to one or more machine learning models trained to perform computer tasks to generate or identify content items in response to trigger events (e.g., user interactions, such as text queries and button selections). In particular, a large language model can include a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, summaries, or query responses) and/or to identify content items based on various contextual data, including graph information from a knowledge graph and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the morphing interface system utilizes a large language machine-learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or field objects) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

As used herein, the term "output de-hallucination model" refers to a model that combines and/or condenses data from multiple content to prevent or reduce hallucination of a large language model. In particular, the output de-hallucination model can generate field objects from data relevant to an aggregated field by executing computer code. For example, the output de-hallucination model can receive a segment of computer code from a large language model, and based on the contents of the computer code generate a field object combining (e.g., summing, subtracting, multiplying, dividing, averaging, etc.) relevant data from source content items. In some embodiments, the output de-hallucination model is a machine learning model, rule-based system, or scripting engine.

As used herein, the term "fillable digital document" refers to a particular type of content item, such as a digital template, document, or file that includes one or more interactive data fields (e.g., aggregated data fields) for inputting data or information. In particular, a fillable digital document can include, but is not limited to, aggregated data fields, text data fields, checkboxes, drop-down menus, etc. In some instances, the fillable digital document can be a standardized digital tax form (e.g., W2, W9, 1099-NEC, etc.) with one or more interactive data fields. In alternative embodiments, the fillable digital form can be a customized digital template based on receiving user input.

As used herein the term "aggregated data field" refers to an interactive data field that houses and/or is fillable with aggregated, summarized, and/or combined data (e.g., from multiple sources). In particular, the aggregated data field is fillable with a collection of combined numerical data that is determined to relate to the aggregated data field. For example, the aggregated data field can correspond to a defined value for a designated subject matter and can include information conforming to the defined value for the designated subject matter. To illustrate, the aggregated data field in a digital W2 document can correspond to the social security tax withheld field and the field object generation system 106 can populate the social security tax withheld field with the correct value. For instance, in some embodiments, the field object generation system can populate the aggregated data field with a field object by combining data from one or more individual and/or separately stored documents.

Relatedly, as used herein, the term "field object" refers to a type of content item insertable into data fields of other content items and generated as a combination, summary, or aggregation of data from multiple sources (within a single source content item or across multiple source content items). In particular, in some embodiments, the field object can include, or be generated by, a computer code object (e.g., a JavaScript object notation object or "JSON" object) that defines a value associated with an aggregated data field, resulting from a combination of data relevant to the aggregated data field. For instance, in one or more embodiments, the field object can be a specific combination of values to fill an aggregated data field which specifies a subject matter and an amount. For example, the field object generation system 106 can generate the field object by averaging, summing, finding the difference between, or otherwise combining data relevant to the aggregated data field.

As used herein, the term "session object" refers to a computer code object that designates an instance or a set of processes of user account interaction with a fillable digital document. In particular, a session object can include an identifying value associated with one or more instances of the fillable digital document, where an instance can represent a state of the fillable digital document (e.g., a modified state or an unmodified state). In one or more embodiments, initially opening the fillable digital document generates a session object corresponding to the fillable digital document, which session object persists through state changes of the fillable digital document as modifications are made to fill aggregated data fields. Moreover, the field object generation system 106 can associate one or more source content items with the session object if the source content items include data relevant to the fillable digital document.

As used herein, the term "content source summarization model" refers to a model that extracts, summarizes, and/or ranks data within a source content item or aggregated data field. For instance, the content source summarization model can extract keywords, values, sentences, dates, and/or phrases from source content items, aggregated data field, and/or fillable digital documents. In some cases, the content source summarization model can rank the importance of the keywords, values, sentence, and/or phrases using machine-learning models, graph-based methods (e.g., TextRAnk), or cosine similarity. For example, the content source summarization model can generate a content source summary of a paystub that includes year to date gross wages, pay period, and year to date deductions.

As used herein, the term "source content item summary" refers to a summary or a condensed version of a source content item. For instance, a source content item summary includes a data file, a textual synopsis, a data table, or an outline reflecting information, text, and/or data within a source content item. For instance, in some embodiments, the field object generation system can generate a source content item summary by using a content source summarization model to analyze segments of text representing data within the source content items.

As used herein, the term "aggregated data field summary" refers to a computer-generated summary or description of values, units, and/or text associated with an aggregated data field. For instance, in one or more embodiments, the aggregated data field summary can describe a type of the value of the aggregated data field and/or a combination of values represented in the aggregated data field (including their source locations and/or other designating information).

As used herein, the term "source content topic" refers to a topic or subject matter describing the types, values, descriptions, or quantities of data within the source content items. For instance, the source content topic could describe the theme of the source content item. To illustrate, in one or more embodiments, the source content topic for a source content item could be a paystub including paycheck data.

As used herein, the term "aggregated field topic" refers to a topic or subject matter for an aggregated data field. For example, an aggregated field topic can include specific information (e.g., data types, metadata labels, values, amounts, or quantities) associated with the aggregated data field. For instance, in one or more cases, the field object generation system 106 can determine the aggregated field topic by analyzing the fillable digital document utilizing the large language model and/or by extracting metadata associated with specific aggregated data fields in the fillable digital document.

Additional detail regarding the field object generation system will now be provided with reference to the figures. For example, FIG. 1 illustrates a schematic diagram of an example system environment for implementing a field object generation system 106 in accordance with one or more embodiments. An overview of the field object generation system 106 is described in relation to FIG. 1. Thereafter, a more detailed description of the components and processes of the field object generation system 106 is provided in relation to the subsequent figures.

As shown, the environment includes server(s) 102, a client device 110, and a network 114. Each of the components of the environment can communicate via the network 114, and the network 114 may be any suitable network over which computing devices can communicate. Example networks are discussed in more detail below in relation to FIGS. 10-11.

As mentioned above, the example environment includes client device 110. The client device 110 can be one of a variety of computing devices, including a smartphone, a tablet, a smart television, a desktop computer, a laptop computer, a virtual reality device, an augmented reality device, or another computing device as described in relation to FIGS. 10-11. The client device 110 can communicate with the server(s) 102 and/or the database 108 via the network 114. For example, the client device 110 can receive user input from a user interacting with the client device 110 (e.g., via the client application 112) to, for instance, access, generate, modify, or share a content item, to collaborate with a co-user of a different client device, or to select a user interface element. In addition, the field object generation system 106 on the server(s) 102 can receive information relating to various interactions with content items and/or user interface elements based on the input received by the client device 110 (e.g., to access source content items, populate a fillable digital document, or perform some other action).

As shown, the client device 110 can include a client application 112. In particular, the client application 112 may be a web application, a native application installed on the client device 110 (e.g., a mobile application, a desktop application, etc.), or a cloud-based application where all or part of the functionality is performed by the server(s) 102. Based on instructions from the client application 112, the client device 110 can present or display information, including a user interface for presenting fillable digital documents, source content items, or populated digital documents from the content management system 104 or from other network locations.

As illustrated in FIG. 1, the example environment also includes the server(s) 102. The server(s) 102 may generate, track, store, process, receive, and transmit electronic data, such as digital content items, computer code segments, text segments, field objects, interface elements, interactions with digital content items, interactions with interface elements, and/or interactions between user accounts or client devices. For example, the server(s) 102 may receive data from the client device 110 in the form of an interaction with a selectable option requesting the population of one or more aggregated fields in a fillable digital document. In some cases, the server(s) 102 may receive user input uploading a particular source content item to field object generation system 106. In addition, the server(s) 102 can transmit data to the client device 110 in the form of a field object that includes a combination of data relevant to the fillable digital document. Indeed, the server(s) 102 can communicate with the client device 110 to send and/or receive data via the network 114. In some implementations, the server(s) 102 comprise(s) a distributed server where the server(s) 102 include(s) a number of server devices distributed across the network 114 and located in different physical locations. The server(s) 102 can comprise one or more content servers, application servers, communication servers, web-hosting servers, machine learning server, and other types of servers.

As shown in FIG. 1, the server(s) 102 can also include the field object generation system 106 and the database 108 as part of a content management system 104. The content management system 104 can communicate with the client device 110 to perform various functions associated with the client application 112 such as managing user accounts, populating fillable digital documents, managing a repository of source content items, and facilitating user interaction with the source content items. Indeed, the content management system 104 can include a network-based smart cloud storage system to manage, store, and maintain content items and related data across numerous user accounts, including user accounts in collaboration with one another. In some embodiments, the field object generation system 106 and/or the content management system 104 utilize the database 108 to store and access information such as digital content items.

Although FIG. 1 depicts the field object generation system 106 located on the server(s) 102, in some implementations, the field object generation system 106 may be implemented by (e.g., located entirely or in part on) one or more other components of the environment. For example, the field object generation system 106 may be implemented by the client device 110. For example, the client device 110 can download all or part of the field object generation system 106 for implementation independent of, or together with, the server(s) 102.

In some implementations, though not illustrated in FIG. 1, the environment may have a different arrangement of components and/or may have a different number or set of components altogether. For example, the client device 110 may communicate directly with the field object generation system 106, bypassing the network 114. As another example, the environment can include the database 108 located external to the server(s) 102 (e.g., in communication via the network 114), located on the server(s) 102 as illustrated in FIG. 1, and/or on the client device 110.

Figure 2:
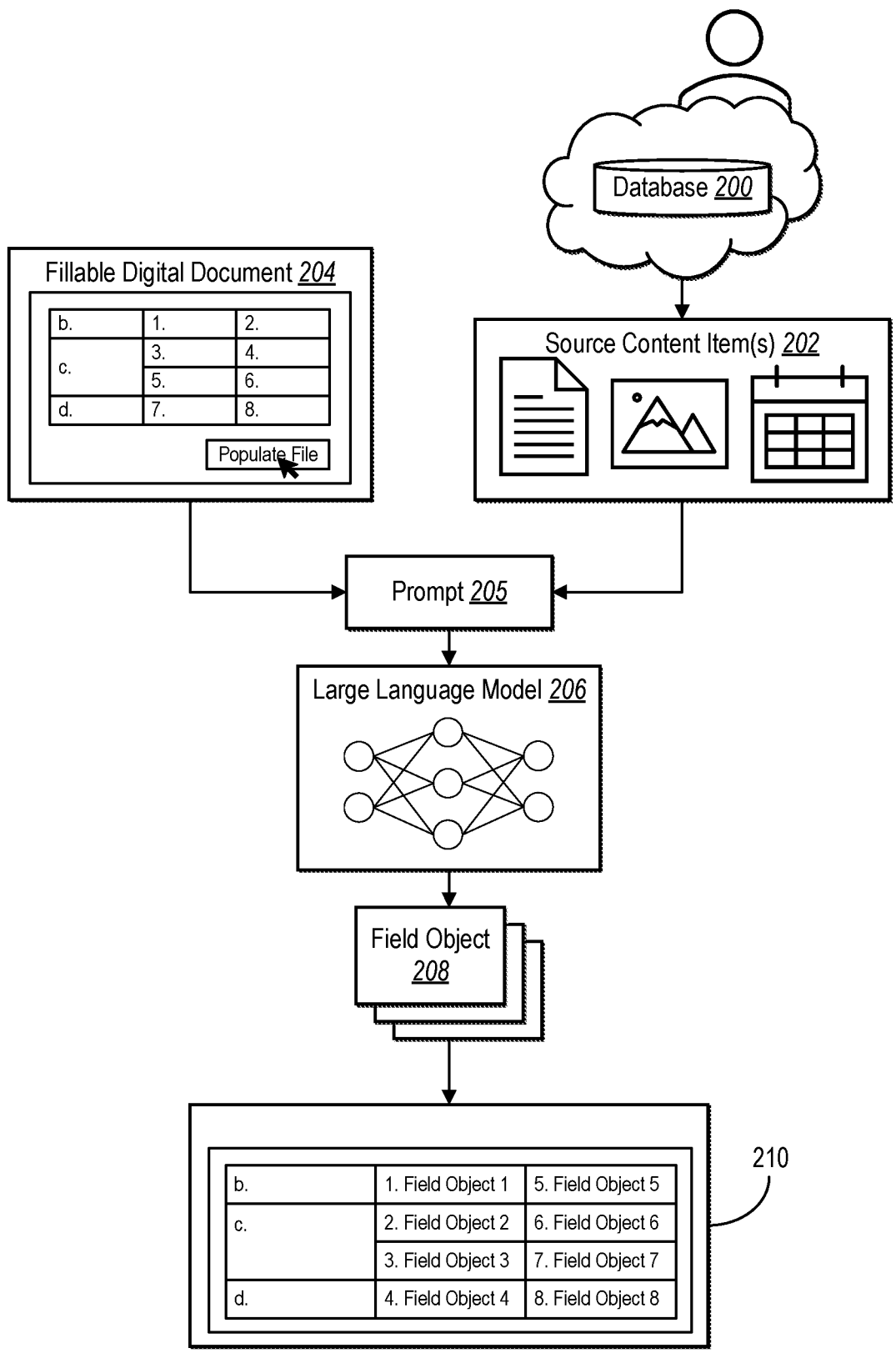
FIG. 2 illustrates an overview of a field object generation system generating a field object and modifying a fillable digital document using a large language model in accordance with one or more embodiments.

As mentioned above, in certain embodiments, the field object generation system 106 can generate a field object from data to populate an aggregated data field of a fillable digital document. For example, the field object generation system 106 can generate a field object by combining data from various locations within one or more source content items and can insert the field object into a corresponding aggregated data field of a fillable digital document. FIG. 2 illustrates an exemplary workflow of a field object generation system 106 generating a field object 208, using a large language model 206 from data relevant to an aggregated data field and modifying the fillable digital document to include the fillable digital document in accordance with one or more embodiments.

As illustrated in FIG. 2, the field object generation system 106 identifies, receives, or accesses a fillable digital document 204. For example, the field object generation system 106 accesses the fillable digital document 204 from a database (e.g., a repository of fillable digital documents) or a web-based digital document processor (e.g., a web-based tax preparation system). In some implementations, the field object generation system 106 can receive a user interaction from a client device requesting population of one or more aggregated data fields in the fillable digital document 204. For example, in some embodiments, the field object generation system 106 can detect an interaction with a selectable option to populate the fillable digital document 204.

As further illustrated in FIG. 2, based on the interaction selecting the option to populate the fillable digital document 204, the field object generation system 106 can determine data relevant to the one or more aggregated fields of the fillable digital document 204. For example, the field object generation system 106 can utilize a prompt 205 based on the content of fillable digital document 204 to ensure that the large language model 206 processes the relevant information from the source content items 202. Specifically, the field object generation system 106 can generate the prompt 205 as a text-based output request that includes a description of the fillable digital document 204 (and/or one or more fields for populating within the fillable digital document 204) and/or a description of the source content item(s) 202. The field object generation system 106 can thus utilize the prompt 205 to trigger the large language model 206 to generate a field object 208 based on the fillable digital document 204 and the source content item(s) 202 (e.g., including data aggregated from the source content item(s) 202 to populate a field of the fillable digital document 204).

As further shown in FIG. 2, the field object generation system 106 can utilize a large language model 206 to process one or more relevant source content item(s) 202 associated with a user account that can be stored in a database 200. By processing the source content item(s) 202, the field object generation system 106 can determine if data within the one or more source content item(s) 202 corresponds to one or more aggregated data fields in the fillable digital document 204. Indeed, the field object generation system 106 can compare topics or subject matter of respective aggregated data fields with topics or subject matter of the source content item(s) 202 to determine relevance.

As FIG. 2 shows, in one or more embodiments, the field object generation system 106 can generate a field object 208 from the relevant data in the one or more source content item(s) 202. For example, the field object generation system 106 can use the large language model 206 to generate a computer code segment that defines the data relevant to the aggregated data fields in the source content item(s) 202 and that is executable to combine the relevant data into the field object 208. In some cases, the field object generation system 106 can combine the relevant data from the source content item(s) 202 using an output de-hallucination model that processes or executes the computer code segment. Furthermore, in one or more embodiments, the field object generation system 106 can modify the fillable digital document 204. For example, the field object generation system 106 can generate a populated digital document 210 by inserting one or more field objects into one or more aggregated data fields in the fillable digital document 204 (e.g., by populating an aggregated data field determined to be relevant to the field object 208).

Figure 3:
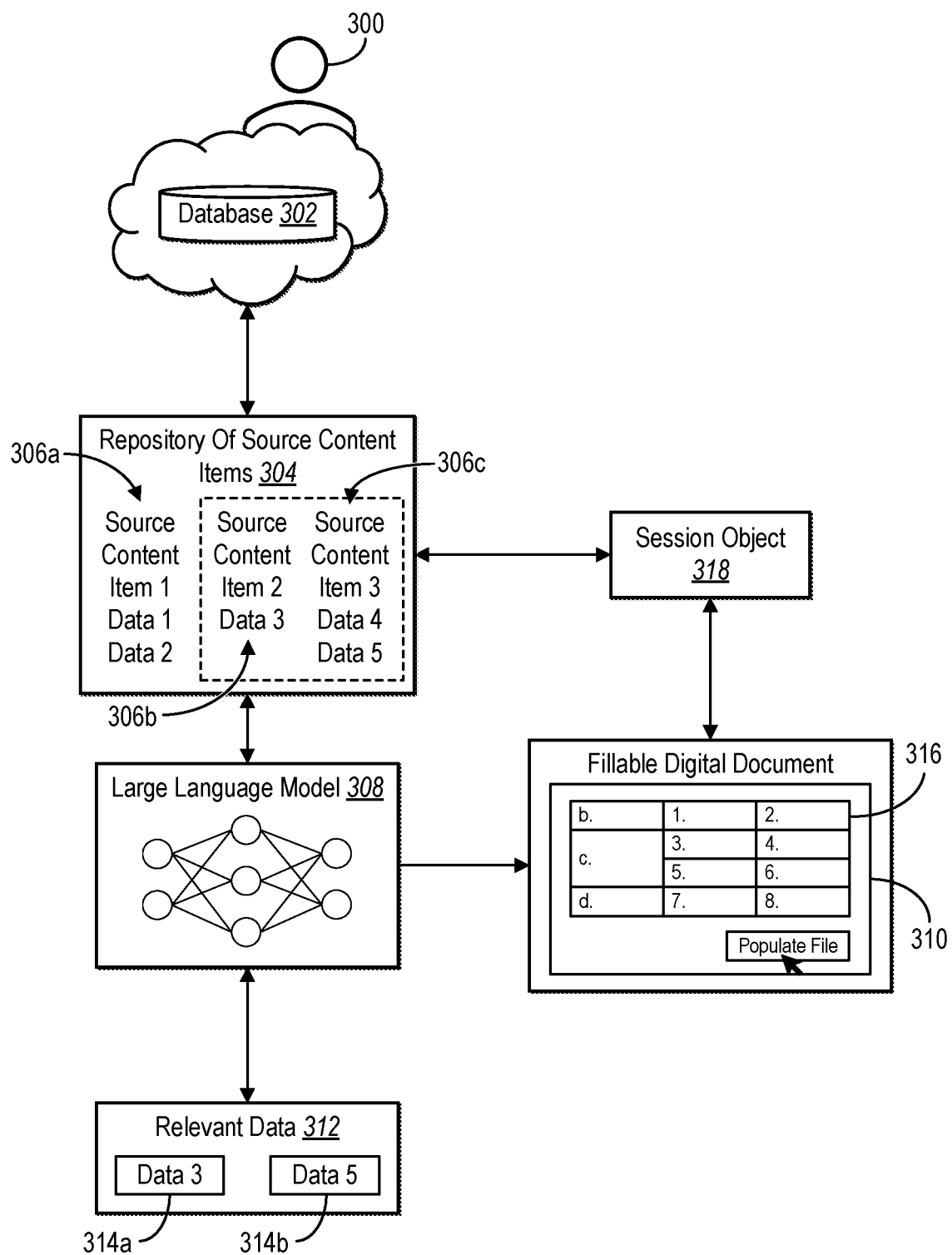
FIG. 3 illustrates an example diagram of the field object generation system determining data relevant to one or more aggregated data fields in the fillable digital document by using a large language model in accordance with one or more embodiments.

As previously mentioned, the field object generation system 106 can determine, from one or more source content items, data relevant to one or more aggregated data fields in a fillable digital document. FIG. 3 illustrates an example diagram of the field object generation system 106 determining data relevant to one or more aggregated data fields in a fillable digital document by using a large language model in accordance with one or more embodiments. As shown in FIG. 3, the field object generation system 106 can select source content items based on relevance to a fillable digital document 310. As indicated by the dashed box, the field object generation system 106 can select one or more source content items 306b-c (while omitting a source content item 306a) from among a repository of source content items 304 associated with the user account 300 of the content management system located within a database 302. In particular, the field object generation system 106 can select source content items based on relevance to the fillable digital document 310. As shown in FIG. 3, the field object generation system 106 selected source content item two 306b and source content item three 306c based on their relevancy to the fillable digital document 310.

In one or more embodiments, the field object generation system 106 can determine the relevance of the source content items 306a-c to the fillable digital document 310 by analyzing and/or processing the source content items 306a-c and/or the fillable digital document 310. For instance, in some embodiments, the field object generation system 106 can analyze the source content items 306a-c and the fillable digital document 310 by generating text representations of the source content items 306a-c and/or the fillable digital document 310. For instance, in some implementations, the field object generation system 106 can convert the source content items 306a-c into text representations. For instance, in some embodiments, the field object generation system 106 can utilize a machine learning model or a collection of models for converting digital content from one format, type, or code structure to another. In particular, in one or more embodiments, the field object generation system 106 can generate the text representation of one or more source content items 306a-c by converting the source content items 306a-c from their initial, native format to a string of text. For instance, in some cases, the field object generation system 106 can convert the source content items 306a-c in a portable document format (PDF) into a text representation of the data in the source content item(s) 306a-c.

As just indicated, in one or more implementations, the field object generation system 106 can generate a text representation of the information (e.g., subject matter) of the source content items 306a-c. Relatedly, in one or more embodiments, the field object generation system 106 can generate a textual representation of the fillable digital document 310 and/or constituent aggregated data fields within the fillable digital document 310. For instance, as described above, the field object generation system 106 can utilize the machine learning model or one or more models to convert the fillable digital document 310 and/or the aggregated data fields in the fillable digital document 310 from its native format to a text format. For example, the field object generation system 106 can generate a text representation of the fillable digital document identifying the value, topic, and/or theme associated with the fillable digital document 310. Moreover, the field object generation system 106 can generate a text representation reflecting the value, quantity or topic associated with each aggregated data field within the fillable digital document 310.

In one or more embodiments, once the field object generation system 106 generates text representations of the source content items 306a-c, the fillable digital document 310, and/or the aggregated data fields in the fillable digital document 310, the field object generation system 106 can determine the relevance of the source content items 306a-c to the fillable digital document 310. In particular, the field object generation system 106 can compare the text representation of the source content items 306a-c with the text representation of the fillable digital document 310. For instance, in some implementations, the field object generation system 106 can utilize a large language model 308 to determine if the source content items 306a-c contain data relevant to the fillable digital document 310. For example, based on the text representation of the fillable digital document 310, the field object generation system 106 can utilize a large language model to determine if the data within the text representation of the source content items 306a-c corresponds to data, values or information in the fillable digital document 310. In one or more embodiments, the fogs can utilize a machine learning model or combination of machine learning models to analyze the text representations of the fillable digital document 310 to determine if the data within the source content items 306a-c is relevant to the aggregated data fields in the fillable digital document 310.

For example, in some embodiments, the field object generation system 106 can measure or determine similarity in an embedding space. Indeed, the field object generation system 106 can determine measures of similarity or dissimilarity between the source content items 306a-c and the aggregated data fields in the fillable digital document 310 by extracting and comparing respective vectors or embeddings for each. For example, the field object generation system 106 can generate vectors and/or embeddings of the aggregated data fields and the source content items 306a-c in a latent space using the large language model 308. In certain implementations, the field object generation system 106 can measure the distance in the embedding space between the source content item vectors and the aggregated data field vectors. In some embodiments, the field object generation system 106 can determine the cosine similarities between the source content item vectors and the aggregated data field vectors. Based on the distance or cosine similarity (e.g., exceeding a similarity threshold), the field object generation system 106 can determine that the source content items 306a-c contain data relevant to one or more aggregated data fields in the fillable digital document 310.

In some implementations, the field object generation system 106 can further determine which data within the source content items 306a-c is relevant to one or more aggregated data fields in the fillable digital document. For instance, as described above, the field object generation system 106 can generate vectors representing individual data elements within the source content items 306a-c and measure the distance between the data element vectors and the aggregated data field vectors in the latent space. In some cases, based on the distance, the field object generation system 106 can identify which data (e.g., data elements) within the source content items 306a-c is relevant to the fillable digital document 310.

In some embodiments, the field object generation system 106 can utilize the large language model to determine if individual data elements within the source content item relate to values, topics or information in the fillable digital document 310. For example, the field object generation system 106 can utilize the large language model 308 by analyzing the source content items with a prompt. To illustrate, the field object generation system 106 can upload the source content items into the large language model and ask which data within the source content items is used to determine the value in aggregated data field 316 of the fillable digital document 310.

As shown in FIG. 3, the field object generation system 106 selects source content item two 306b and source content item three 306c from the repository of source content items 304. In particular, the field object generation system 106 selects source content item two 306b and source content item three 306c because the field object generation system 106 determines that they are within a threshold similarity of a topic or a subject matter of the aggregated data field 316. Accordingly, the field object generation system 106 uses the data within source content item two 306b and source content item three 306c to calculate the value of aggregated data field 316.

As an example, in some embodiments, the field object generation system 106 can generate a text representation of a payroll source content item, a W-4 source content item, an employee email list content source item, and a fillable digital W2 document. The field object generation system 106 can compare the text representations of the payroll source content item, the W-4 source content item, the employee email list content source item, and the fillable digital W2 with the large language model. In particular, the field object generation system 106 can process, using the large language model 308, the payroll source content item, the W-4 source content item, the employee email list content source item by applying the prompt "Is data within the payroll source content item, the W-4 source content item, the employee email list content source item" needed to calculate federal income withheld. In such embodiments, the large language model can determine that the payroll source content item and the W-4 source content item are relevant to the fillable digital W2 because the fillable digital W2 needs data and/or information from the payroll source content item and the W-4 source content item to determine the federal income withheld value of the aggregated data field. In one or more implementations, based on the relevance to the fillable digital W2, the field object generation system 106 can select the payroll source content item and the W-4 source content item from the repository of source content items 304 associated with the user account.

In one or more embodiments, the field object generation system 106 can select the one or more source content items from among a repository of source content items associated with the user (e.g., the database 302) by associating certain source content items 306a-c with the fillable digital document 310. For example, the field object generation system 106 can associate employee paystub source content items with a fillable digital W2. In certain embodiments, the field object generation system 106 can select one or more source content items from the repository of source content items associated with the user account, based on relevance to the fillable digital document by receiving from the client device, a selection of one or more source content items.

In some embodiments, the field object generation system 106 can determine that the data of the source content items 306a-c is relevant to the aggregated data field 316 in the fillable digital document 310 by generating a session object 318. As shown in FIG. 3, source content item two 306b and source content item three 306c share the same session object as fillable digital document 310 because they contain data relevant to the fillable digital document 310. Thus, in instances where the fillable digital document 310 need further modifications, the field object generation system 106 can quickly identify source content items 316b-c with data relevant to one or more aggregated data fields in the fillable digital document 310.

As further shown in FIG. 3, the field object generation system 106 can determine if data within the one or more source content items corresponds to the aggregated data fields in the fillable digital document 310. In some cases, the field object generation system 106 can utilize a large language model 308 to determine if the data within the source content items 306a-c corresponds to the aggregated data fields in the fillable digital document 310. For instance, in one or more embodiments, the field object generation system 106 can determine if the data within the one or more source content items 306b-c corresponds to one or more aggregated data fields in the fillable digital document 310 by determining and comparing the subject matter of the source content items 306b-c and the aggregated data fields.

In one or more embodiments, the field object generation system 106 can determine the subject matter of the source content items by analyzing the text representations of the source content items. For instance, the field object generation system 106 can analyze the text representation of the source content items 306b-c using the large language model 308 to identify data, information, and/or topics in the source content items 306b-c. For example, analyzing the text representation of a payroll source content item with the large language model 308 would generate an output identifying the subject matter of the payroll source content item. For instance, the subject matter of the payroll source content item could include gross wages, benefits, income tax deductions, pay period, etc.

Relatedly, the field object generation system 106 can determine the subject matter of aggregated data fields in the fillable digital document 310. For example, the field object generation system 106 can analyze the text representation of the aggregated data field 316 in the fillable digital document 310 with the large language model 308. In some cases, the subject matter of the aggregated data field 316 can be a value or a combination of values. For instance, in some implementations, the field object generation system 106 can identify a value corresponding to the aggregated data field 316 by analyzing the text representation of the aggregated data field 316 with the large language model 308. For example, the field object generation system 106 can utilize the large language model 308 to analyze a text representation of the fillable digital W2 to determine that the subject matter of the aggregated data field is allocated tips.

In one or more embodiments, the field object generation system 106 can compare the subject matter of the source content items 306a-c with the subject matter of one or more aggregated data fields (e.g., the aggregated data field 316). For instance, the field object generation system 106 can utilize the large language model 308 to compare the subject matter of the source content items 306a-c and the aggregated data fields in the fillable digital document 310. For example, in one or more cases, the large language model 308 can determine how closely the subject matter of the source content item 306a-c matches with the subject matter of the aggregated data field. For example, in some cases, the large language model 308 can determine if a value for the aggregated data field relates to the data in the source content items 306a-c. For instance, the large language model 308 can determine if the subject matter of the source content items 306a-c is used to determine the value (e.g., subject matter) of the aggregated data field.

As further indicated in FIG. 3, based on comparing the subject matter of the source content items 306a-c and the subject matter of the aggregated data fields, the field object generation system 106 can determine if the data in the source content items 306a-c is relevant to the aggregated data fields. For example, as indicated above, based on the subject matter of the source content items 306a-c being used to calculate the value (e.g., subject matter) of the aggregated data field, the field object generation system 106 can determine that the data in the source content items 306b-c is relevant to the aggregated data field. In one or more embodiments, the subject matter of a source content item 306b-c can be relevant to multiple aggregated data fields in the fillable digital document 310.

As shown in FIG. 3, the field object generation system 106 can determine the relevant data 312 from the source content items 306b-c. In particular, based on comparing the subject matter of the source content items 306a-c with the subject matter of the aggregated data fields, the field object generation system 106 can determine that the data is relevant to the aggregated data fields. For example, the field object generation system 106 can determine that data three 314a from source content item two 306b and data five 314b from source content item three 306c is relevant to aggregated data field 316 in the fillable digital document 310. As discussed in more detail below in FIG. 6, once the field object generation system 106 determines which data is relevant to the fillable digital document 310, the field object generation system 106 can further process the relevant data with a large language model and generate a field object.

Figure 4:
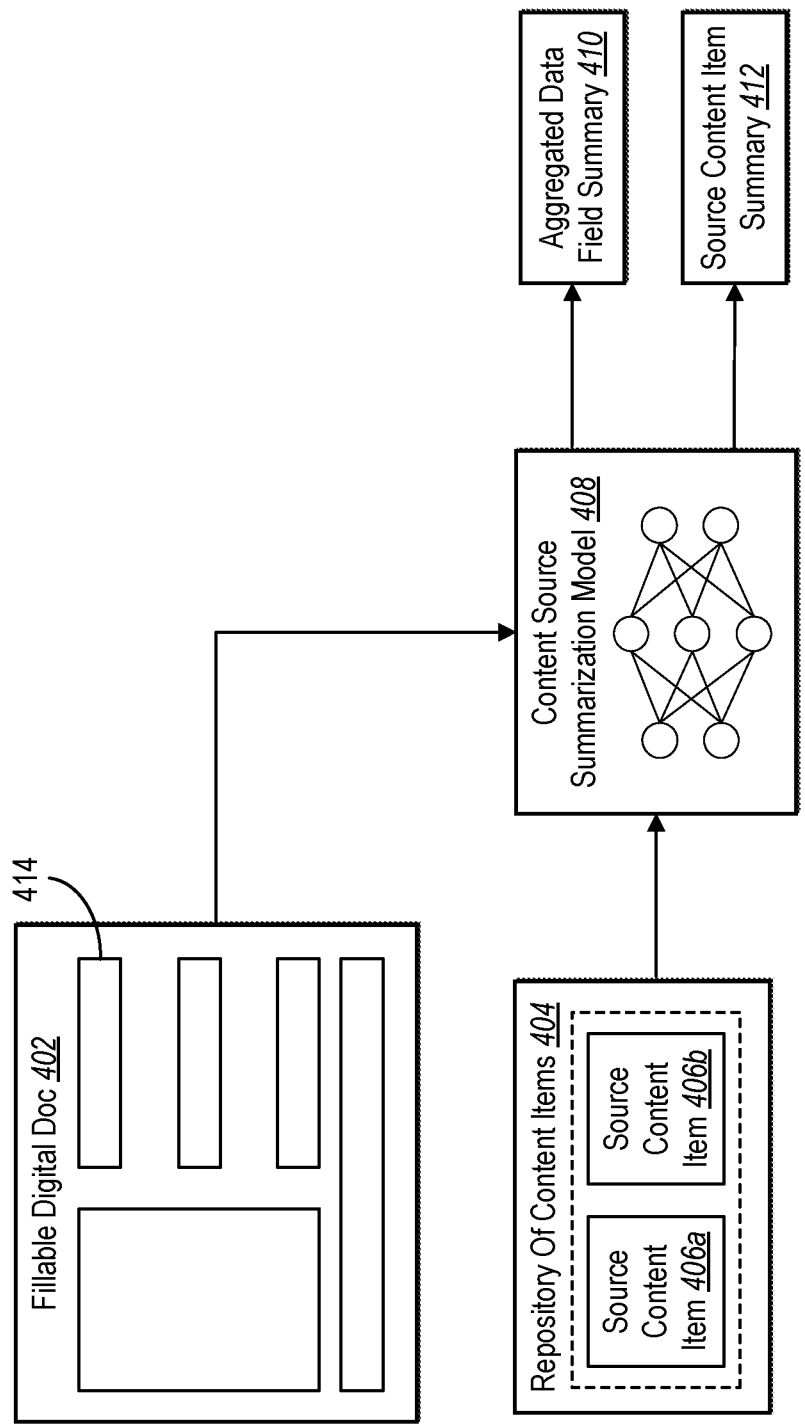
FIG. 4 illustrates the field object generation system generating an aggregated data field summary and a source content item summary utilizing a content source summarization model in accordance with one or more embodiments.

As just discussed, the field object generation system 106 can compare the subject matter of the source content items and the subject matter of the aggregated data fields utilizing a large language model. In certain embodiments, the field object generation system 106 can compare the subject matter of the source content items and the subject matter of the aggregated data fields by generating summaries of the source content items and the aggregated data fields within the fillable digital document. FIG. 4 provides an overview of the field object generation system 106 comparing the subject matter of the source content items and the aggregated data field utilizing a content source summarization model in accordance with one or more embodiments. In particular, FIG. 4 illustrates an embodiment of determining relevant data within one or more source content items that so that large language model can process and generate a field object for an aggregated data field.

For instance, as shown in FIG. 4, in certain implementations, the source content summarization model can generate a source content item summary 412 for each source content item 406a-b within the repository of content items 404 associated with a user account by analyzing the text representation of the source content items 406a-b with the content source summarization model 408. For instance, the summarization model can parse down the data in the source content items 406a-b and identify the relevant data in the content source items to feed to a large language model for further processing. In some embodiments, the content source summarization model 408 can apply an aggregated data field prompt to the segments of text and generate a source content item summary 412 indicating the data relevant to the aggregated data field 414 in the fillable digital document 402. For example, in one or more implementations, the field object generation system 106 can input multiple segments of text representing various pay stubs into the content source summarization model 408. For instance, in certain embodiments, the field object generation system 106 can apply the aggregation data field prompt of "what equation should I use to calculate the value of the aggregated data field for wages, tips, other compensation" to the various segments of text representing the pay stubs. As indicated, based on the aggregation data field prompt and the segments of text representing the pay stubs, the field object generation system 106 can generate a source content summary of the pay stubs flagging the data that is necessary to calculate the value for wages, tips, other compensation.

In one or more embodiments, the field object generation system 106 can apply the aggregation data field prompt to each individual segment of text in the text representation of the source content items. In some embodiments, the field object generation system 106 can group segments of text based on the similarity of the text representations. Moreover, in one or more implementations, the content source summarization model can apply the aggregation data field prompt to the grouped text segments. In some embodiments, the field object generation system 106 can change the aggregation data field prompt to more accurately determine which data is relevant to the aggregated data field. For instance, the field object generation system 106 can utilize few shot prompting to improve the efficacy of the aggregation data field prompt. For example, the field object generation system 106 can input a few examples of prompts for identifying relevant data with regard to an aggregated data field into the large language model. Based on the examples, the field object generation system 106 can generate more accurate source content item summaries and aggregated data field summaries.

As further shown in FIG. 4, in some embodiments, the field object generation system 106 can generate an aggregated data field summary 410 of an aggregated data field 414 in the fillable digital document 402. In some embodiments, the field object generation system 106 can utilize a content source summarization model 408 to summarize the aggregated data field 414. For instance, the content source summarization model 408 can analyze the text representations of the aggregated data field 414 in the fillable digital document 402. For instance, based on the titles, text, and/or values of the text representation of the aggregated data field 414, the content source summarization model 408 can summarize the subject matter that corresponds with the aggregated data field 414. In one or more embodiments, the content source summarization model 408 can generate the aggregated data field prompt that corresponds to the aggregated data field 414. For instance, as described above, the aggregated data field prompt can outline how to calculate the value of the aggregated data field 414 and/or the values necessary to calculate the value associated with the aggregated data field 414. For example, in some embodiments, based on the aggregated data field summary 410, the source content summarization model can determine that the aggregated data field 414 corresponds to a specified value and identify the values needed to generate the specified value. In one or more embodiments, the field object generation system 106 can generate aggregated data field summaries for multiple aggregated data fields in the fillable digital document 402.

To illustrate, based on the aggregated data field prompt asking how to calculate federal income tax withheld in a W2 form, the content source summarization model 408 can generate an aggregated data field summary 410 indicating that the aggregated data field 414 needs the amount of income earned, filing status of the user, number of withholding allowances claimed, and additional withholdings. In some cases, the field object generation system 106 can generate the aggregated data field summary 410 for each aggregated data field in the fillable digital document 402.

As further shown in FIG. 4, the field object generation system 106 can compare the source content item summary 412 and the aggregated data field summary 410. In particular, the field object generation system 106 can determine if the data in the source content item summary 412 matches the data required to determine the value of the aggregated data field 414. For example, in one or more implementations, the field object generation system 106 can generate vectors and/or embeddings of the source content item summary 412 and the aggregated data field summary 410. In certain cases, the field object generation system 106 can measure the similarities between the vectors of the source content item summary 412 and the aggregated data field summary 410 within a latent space by determining the cosine similarity. Based on the cosine similarity ranging from −1 (e.g., perfectly dissimilar) to 1 (e.g., perfectly similar), the field object generation system 106 can determine that the data in the source content items 406a-b is relevant to the aggregated data field 414. For example, a cosine similarity of 0.9 between vectors of the source content item summary 412 and the aggregated data field summary 410 can indicate that the data in the source content item summary 412 is relevant to the value of the aggregated data field 414.

As just mentioned, the field object generation system 106 can generate a source content item summary 412 for a source content item 406a and the aggregated data field summary 410 for the aggregated data field 414 by utilizing the content source summarization model 408. In some embodiments, the content source summarization model 408 is a large language model. Alternatively, in one or more cases, the source content summarization model 408 is a machine learning model or combination of machine learning models that summarize and identify the relevant subject matter of the source content items 406a-b and the aggregated data field 414. For example, the summarization model 408 can be a machine learning model that identifies relevant information within the source content items 406a-b by parsing the data within the source content items 406a-b based on the knowledge of the aggregated data field 414 in the fillable digital document 402. In some embodiments, once the summarization model 408 identifies the relevant data, the field object generation system 106 can feed the parsed down data into a large language model to generate a field object, as described below in FIG. 6.

Figure 5:
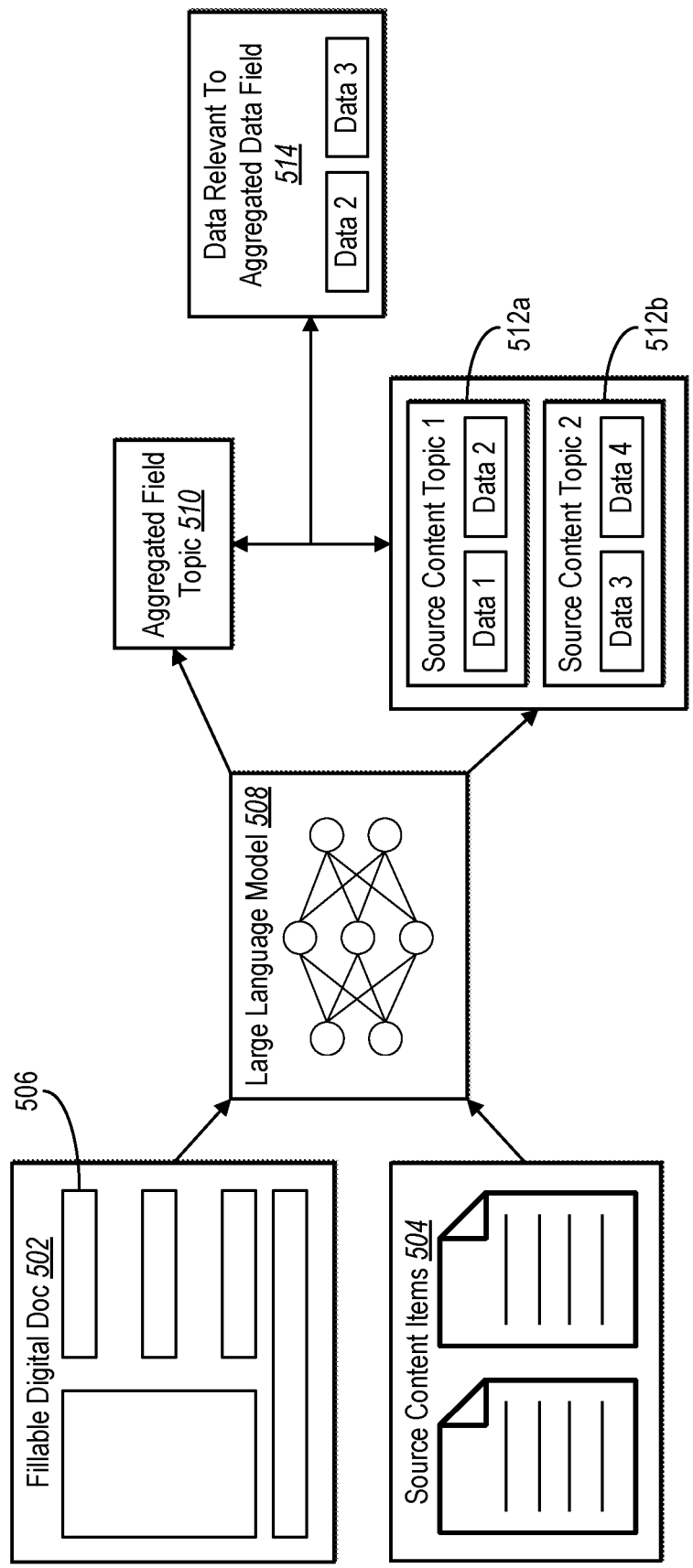
FIG. 5 illustrates the field object generation system determining an aggregated field topic for the aggregated data field and a source content topic for data within a source content item in accordance with one or more embodiments.

As just discussed, the field object generation system 106 can determine that data within one or more source content items corresponds to one or more aggregated data fields in a fillable digital document. For example, the field object generation system 106 can compare subject matter of source content items with that of aggregated data fields. FIG. 5 illustrates the field object generation system 106 determining that data within one or more source content items corresponds to one or more aggregated data fields in a fillable digital document in accordance with one or more embodiments.

As shown in FIG. 5, the field object generation system 106 can determine the aggregated field topic 510 by processing the fillable digital document 502 with the large language model 508. As shown in FIG. 5, in one or more implementations, the fillable digital document 502 includes aggregated data field 506. In certain cases, the aggregated data field 506 can correspond to an aggregated field topic 510.

For example, the large language model 508 can analyze text representations of the aggregated data field 506 and based on the analysis, determine the aggregated field topic 510. As shown in FIG. 5, the field object generation system 106 utilizes the large language model 508 to generate the aggregated field topic 510 for the aggregated data field 506 in the fillable digital document 502. To further illustrate, in a case where the fillable digital document 502 is a digital W2 document, the field object generation system 106 can determine that an aggregated data field of the digital W2 document corresponds to the aggregated data field for reporting federal income tax withheld. In some embodiments, based on knowledge of the fillable digital document 502 and aggregated data field 506, the field object generation system 106 can determine the aggregated field topic 510. In one or more implementations, the field object generation system 106 can utilize a machine learning model or combination of machine learning models to generate the aggregated field topic 510.

As further shown in FIG. 5, the field object generation system 106 can generate source content topics 512a-b utilizing the large language model 508. In particular, in one or more cases, the large language model 508 can process a text representation of the source content items 504. Based on processing the source content items 504 with the large language model 508, the field object generation system 106 can identify the subject of the source content items 504 and label the data within the source content items 504 with the source content topics 512a-b.

As further shown in FIG. 5, the field object generation system 106 can compare the aggregated field topic 510 and the source content topics 512a-b. In particular, the field object generation system 106 can determine if the aggregated field topic 510 requires any data associated with the source content topics 512a-b. In one or more implementations based on comparing the source content topics 512a-b and the aggregated field topic 510, the field object generation system 106 can determine data relevant to the aggregated data field 514. In one or more cases, the field object generation system 106 parses down the data in the source content items to prepare the relevant data for further processing with a large language model.

To illustrate, the field object generation system 106 can determine a source content topic for a W4. For instance, in some embodiments, the source content topic for the data in the W4 can be tax deductions because the W4 indicates the correct amount to withhold from a paycheck for income taxes. Relatedly, the field object generation system 106 can determine that the aggregated field topic for an aggregated field is federal income tax withheld. In such embodiments, the field object generation system 106 can compare the federal income tax withheld aggregated field topic with the tax deductions source content topic. Based on the comparison, the field object generation system 106 can determine that data within the W4 is relevant to the federal income tax aggregated data field. In one or more embodiments, once the system determines the data relevant to the aggregated data field 514, the field object generation system 106 can generate a field object by processing the relevant data with a large language model as described below in FIG. 6.

Figure 6:
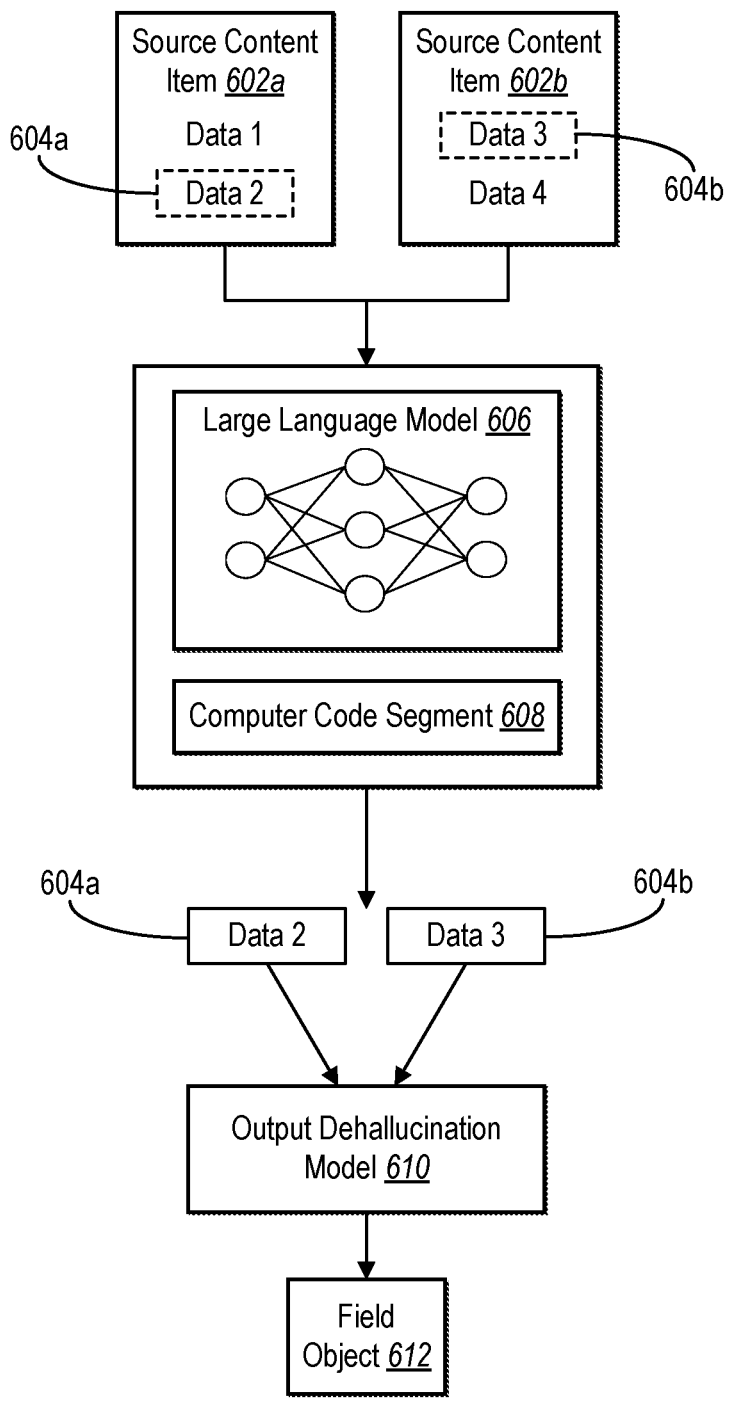
FIG. 6 illustrates the field object generation system generating a field object in accordance with one or more embodiments.

As mentioned, in some embodiments, the field object generation system 106 generates field objects from relevant data for inserting into aggregated data fields. For example, the field object generation system 106 can generate a field object that indicates data to include within an aggregated data field and that is executable to generate the data. FIG. 6 illustrates the field object generation system 106 generating the field object in accordance with one or more embodiments.

As indicated above, in some embodiments, the field object generation system 106 can utilize a large language model to convert a text representation of relevant data into a different data structure. FIG. 6 further shows the field object generation system 106 utilizing a large language model 606 to change the data structure of the relevant data. In particular, FIG. 6 shows an embodiment of the field object generation system 106 generating a computer code segment 608 of the relevant data in the source content items 602a-b. Specifically, the field object generation system 106 utilizes the large language model 606 to generate the computer code segment 608 that indicates the relevant data from the source content items and that is executable (by the output de-hallucination model 610) to generate the field object 612.

In one or more cases, the computer code segment 608 can define the data relevant to the aggregated data fields from the source content items 602a-b. For instance, in one or more embodiments, the field object generation system 106 can generate a JavaScript Object Notation (JSON) object representing or defining the relevant data, including where it is located in source content items. For instance, in some cases, the JSON object can represent the text representation of the relevant data in a key-value pairs format. In some embodiments, the computer code segment 608 can be in plain text format, binary format, Comma-Separated Values (CSV) format, etc.

As indicated above, the field object generation system 106 can combine the relevant data to populate an aggregated data field. For example, in one or more embodiments, the field object generation system 106 can combine the data relevant to the aggregated data fields by processing the computer code segment 608 of the relevant data. For example, as shown in FIG. 6, the field object generation system 106 can process the computer code segments of data two 604a and data three 604b by inputting the computer code segments of data into the output de-hallucination model 610. In one or more cases, the field object generation system 106 can use the output de-hallucination model 610 to generate the field object 612 by executing computer code segments designating the relevant data. For instance, the output de-hallucination model 610 can combine the computer segments of relevant data according to the method for determining the value in the aggregated data field. For example, the field object 612 of an aggregated data field for federal income tax withheld can be a combination of data, such as, filling status, the number of allowances, additional withholding, gross income, pay frequencies and IRS tax withholding tables.

As just indicated, the field object generation system 106 can generate a field object 612 from the data relevant to one or more aggregated data fields in the fillable digital document. In some embodiments, the field object generation system 106 can generate the field object 612 by extracting intermediate data objects from the data relevant to one or more aggregated data fields. In particular, in some cases, the field object generation system 106 can input a prompt and the relevant data into the large language model 606 to extract, based on the prompt, individual numerical data (or segments of code representing individual data elements) of the relevant data. In one or more embodiments, the field object generation system 106 can combine the intermediate data objects to generate the field object 612. For instance, in some cases, the field object generation system 106 can utilize an output de-hallucination model to add, subtract, average, divide, and/or multiply the intermediate data objects to generate the field object 612 (e.g., value) associated with the aggregated data field.

In one or more embodiments, once the field object generation system 106 generates the field object 612, the field object generation system 106 can modify the fillable digital document by adding the field object to the fillable digital document. In particular, the field object generation system 106 can populate the aggregated data field with the field object 612 representing the value, quantity, or topic of the aggregated data field. In one or more embodiments, the field object generation system 106 can generate field objects for each aggregated data field in the fillable digital document. In certain implementations, based on receiving a user interaction requesting population of the fillable digital document, the field object generation system 106 can generate one or more field objects for the one or more aggregated data fields in the fillable digital document.

Figure 7:
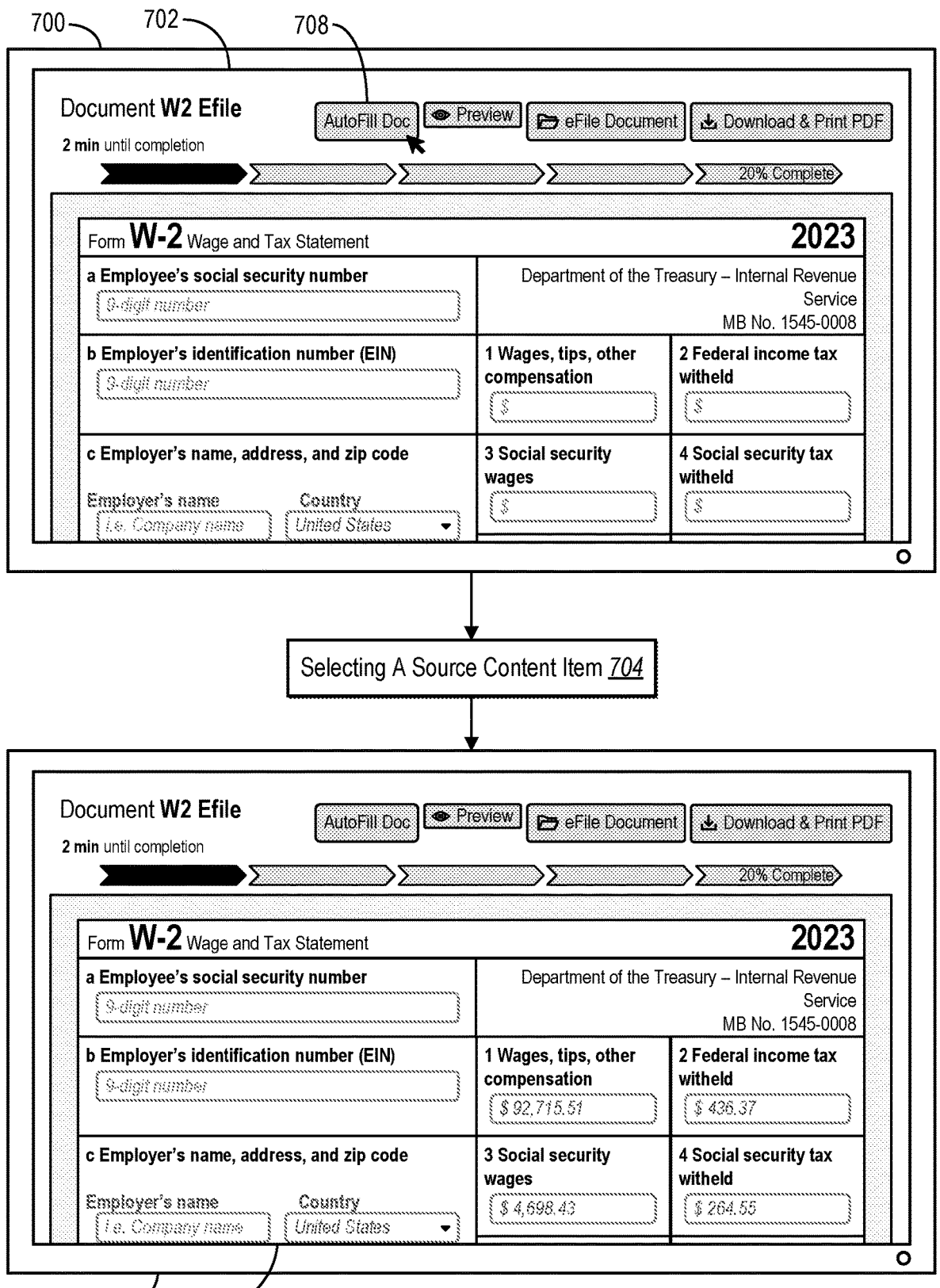
FIG. 7 illustrates an example user interface for modifying the fillable digital document in accordance with one or more embodiments.

As just mentioned, the field object generation system 106 can populate a fillable digital document. FIG. 7 illustrates an exemplary user interface of the field object generation system modifying the fillable digital document in accordance with one or more embodiments. As shown in FIG. 7, the field object generation system 106 can provide the fillable digital document 702 for display on the interface 700 of a client device. The fillable digital document 702 can include combinations of text, aggregated data fields, and selectable elements. For instance, as shown in FIG. 7, the fillable digital document 702 is a fillable digital W2 document with various aggregated data fields (e.g., wages, tips, other compensation, federal income tax withheld, social security wages, social security tax withheld, etc.). As further illustrated in FIG. 7, the fillable digital document 702 can include one or more selectable elements. For instance, FIG. 7 illustrates the fillable digital document 702 with a selectable autofill doc element 708.

As further shown in FIG. 7 and as indicated above, receiving an interaction with the selectable autofill doc element 708 prompts the field object generation system 106 to perform the act 704 of selecting source content items. As described above, the field object generation system 106 can select the source content items with data relevant to one or more aggregated data fields in the fillable digital document 702. Moreover, as described above, once the field object generation system 106 selects the source content items, the field object generation system 106 can populate the aggregated data field fields with field objects corresponding to the values in the aggregated data fields. For example, FIG. 7 shows the field object generation system 106 providing for display the fillable digital document 702 with field objects populating the aggregated data fields.

As just mentioned, in some embodiments, the field object generation system 106 can populate one or more aggregated data fields based on receiving a user interaction requestion population of the fillable digital document. In some embodiments, the field object generation system 106 can generate a populated digital document by pre-populating the fillable digital document 702 without receiving the user interaction. For instance, in one or more cases, field object generation system 106 can determine that all of the relevant data exists in the source content items associated with a user account. In particular, the field object generation system 106 can process every source content item associated with the user account with the large language model (or a subset designated by metadata tags as relating to tax information). For instance, based on identifying all of the data relevant to the aggregated data fields in the fillable digital document, the field object generation system 106 can generate the populated digital document 706.

Figure 8:
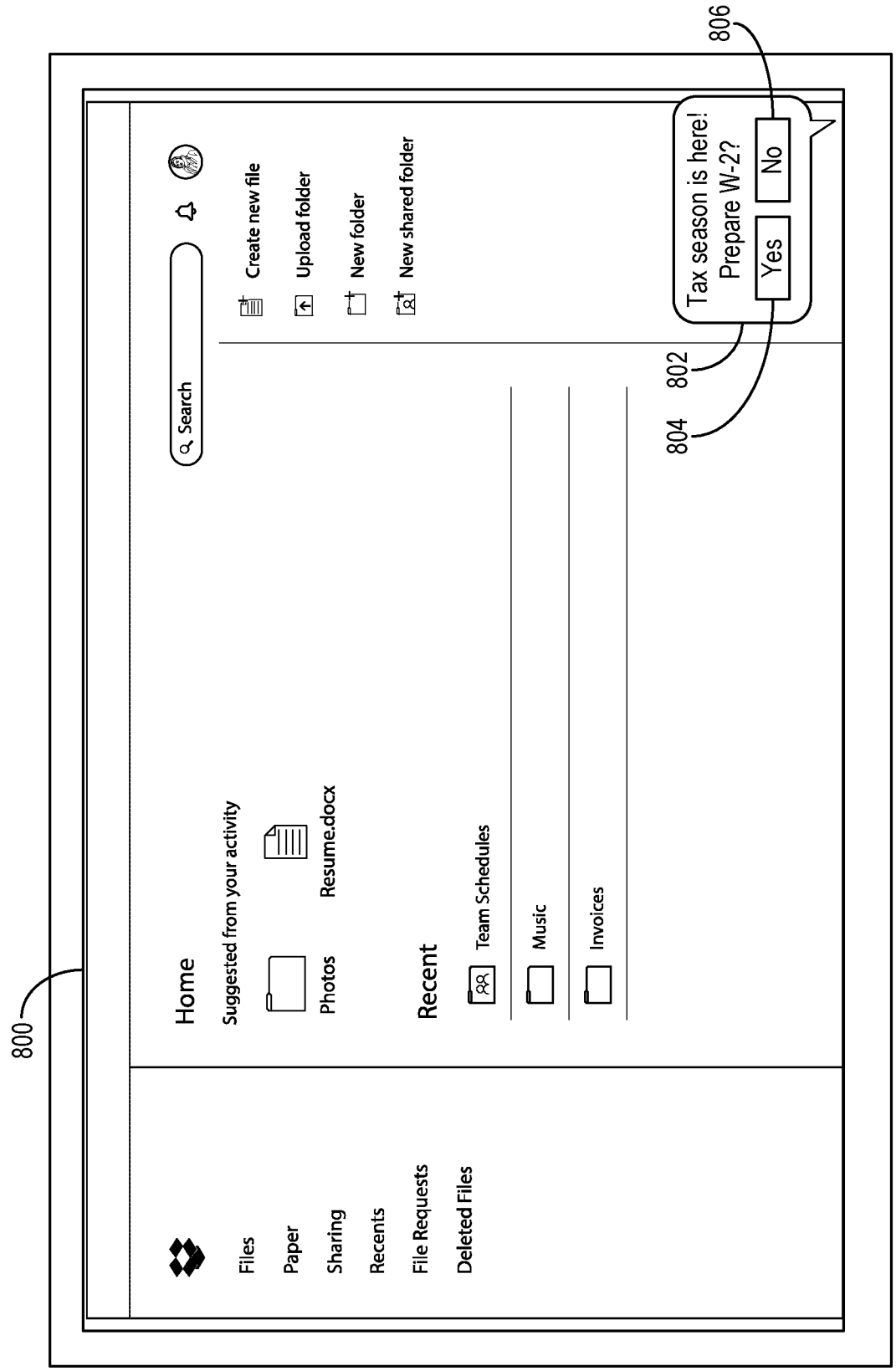
FIG. 8 illustrates an example user interface including a populated digital document notification in accordance with one or more embodiments.

As just mentioned, the field object generation system 106 can generate a populated digital document. In one or more cases, the field object generation system 106 can generate the populated digital document based on receiving a populated digital document notification. For example, the field object generation system 106 can define a triggering event and based on the occurrence of the triggering event, generate the populated digital document notification. For example, the triggering event can be a date (e.g., one month before the required mailing date of a W2). As shown in FIG. 8, in some embodiments, the populated digital document notification 802 can include a question and provide for display a first selectable option 804 (yes) and a second selectable option 806 (no). In one or more implementations, the populated digital document notification 802 can include different selectable options. Based on detecting an interaction with the first selectable option 804, the field object generation system 106 can generate and provide for display on the interface of the client device the populated digital document.

In some implementations, the field object generation system 106 can generate a populated digital document notification 802 based on generating a populated digital document. For instance, the field object generation system 106 can determine that all of the data relevant to the fillable digital document exists in the user account of the content management system. In one or more embodiments, based on determining all of the data relevant to the aggregated data fields in the fillable digital document exists, the field object generation system 106 can generate the populated digital document. Subsequently, based on generating the populated digital document, the field object generation system 106 can generate the populated digital document notification 802 indicating that the populated digital document is ready for display. Based on receiving a user interaction with one of the selectable elements in the populated digital document notification, can provide for display the populated digital document on the interface 800 of the client device. For example, as shown in FIG. 8, in some embodiments, the field object generation system 106 can generate the populated digital document notification 802 while the content management system is open.

FIGS. 1-8, the corresponding text, and the examples provide a number of different systems, methods, and non-transitory computer readable media for determining, utilizing a large language model to process one or more source content items for a user account, data relevant to one or more aggregated data fields in a fillable digital document. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
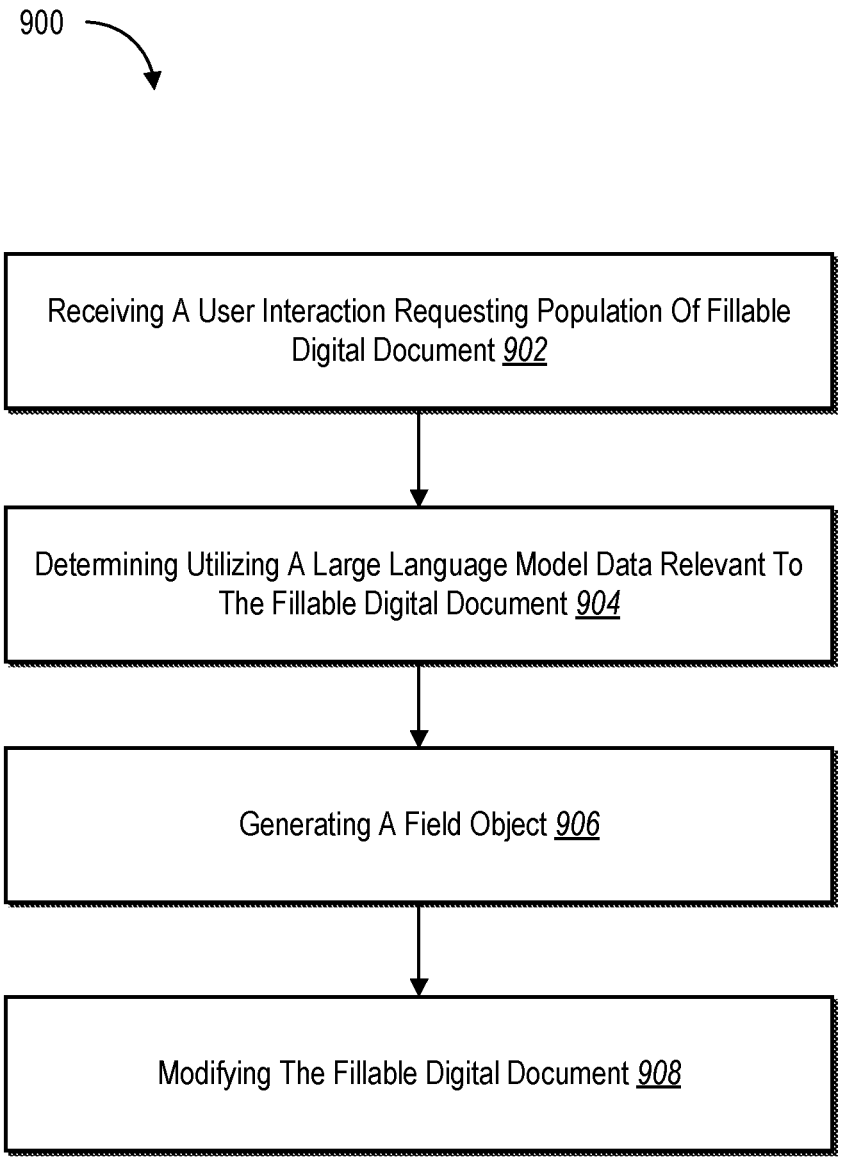
FIG. 9 illustrates an example series of acts for modifying a fillable digital document with field objects from data relevant to the fillable digital document by utilizing a large language learning model.

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for modifying a fillable digital document with field objects from data relevant to the fillable digital document by utilizing a large language learning model. The series of acts can include an act 902 of receiving a user interaction requesting population of a fillable digital document; an act 904 of determining, utilizing a large language model, data relevant to the fillable digital document; an act 906 of generating a field object; and an act 908 of modifying the fillable digital document.

For example, in one or more embodiments, the series of acts 900 can include an act of receiving, from a client device, a user interaction requesting population of one or more aggregated data fields in a fillable digital document. The series of acts 900 can also include an act of, based on the user interaction, determining, utilizing a large language model to process one or more source content items for a user account of a content management system, data relevant to the one or more aggregated data fields in the fillable digital document. The series of acts 900 can further include an act of generating a field object from the data relevant to an aggregated data field from the one or more aggregated data fields. The series of acts 900 can still further include an act of modifying the fillable digital document to include the field object.

For example, in one or more embodiments, the series of acts 900 can include an act of generating the field object by utilizing the large language model to generate a computer code segment defining the data relevant to the one or more aggregated data fields from the one or more source content items, and an act of combining the data relevant to the one or more aggregated data fields by utilizing an output de-hallucination model to process the computer code segment.

Moreover, in some cases, the series of acts 900 can include an act of determining the data relevant to the one or more aggregated data fields by selecting, from among a repository of source content items associated with the user account of the content management system, the one or more source content items based on relevance to the fillable digital document. The series of acts 900 can further include an act of determining, utilizing the large language model, data within the one or more source content items that corresponds to the one or more aggregated data fields in the fillable digital document.

In addition, in one or more implementations, the series of acts 900 can include an act of determining the data within the one or more source content items that corresponds to the one or more aggregated data fields in the fillable digital document by determining an aggregated field topic for the aggregated data field and a source content topic for data within a source content item from among the one or more source content items and comparing the aggregated field topic and the source content topic.

In some embodiments, the series of acts 900 can include an act of determining data within the one or more source content items that corresponds to the one or more aggregated data fields in the fillable digital document by determining a subject matter of the one or more source content items and the one or more aggregated data fields; comparing, utilizing the large language model, the subject matter of the one or more source content items and the one or more aggregated data fields; and based on comparing the subject matter of the one or more source content items and the one or more aggregated data fields, determining the data relevant to the one or more aggregated data fields.

In addition, in some embodiments, the series of acts 900 can include an act of comparing, utilizing the large language model, the subject matter of the one or more source content items and the one or more aggregated data fields by generating, utilizing a content source summarization model, a source content item summary of the source content item for a user account of a content management system and an aggregated data field summary of the aggregated data field in the fillable digital document; and comparing the source content item summary and the aggregated data field summary In one or more implementations, the series of acts 900 can include an act of determining the data relevant to the one or more aggregated data fields in the fillable digital document further by generating a session object corresponding to the fillable digital document, wherein the session object represents one or more unique instances of the fillable digital document, and associating the one or more source content items with the session object.

In some cases, the series of acts 900 can include an act of receiving, from a client device, a user interaction requesting population of one or more aggregated data fields in a fillable digital document, based on the user interaction. The series of acts 900 can also include an act of determining, utilizing a large language model to process one or more source content items for a user account of a content management system, data relevant to the one or more aggregated data fields in the fillable digital document. The series of acts 900 can further include an act of generating a field object from the data relevant to an aggregated data field from the one or more aggregated data fields. The series of acts 900 can still further include an act of populating the aggregated data field with the field object.

In one or more embodiments, the series of acts 900 can include an act of utilizing the large language model to extract intermediate data objects from the data relevant to the one or more aggregated data fields and an act of combining the intermediate data objects into the field object utilizing an output de-hallucination model.

In some implementations, the series of acts 900 can include an act of generating a session object corresponding to the fillable digital document, wherein the session object represents one or more instances of the fillable digital document. The series of acts 900 can also include an act of associating the one or more source content items with data relevant to the one or more instances of the fillable digital document with the session object.

Moreover, in one or more embodiments, the series of acts 900 can include an act of generating a populated digital document by pre-populating the one or more aggregated data fields in the fillable digital document. The series of acts 900 can also include an act of, based on generating the populated digital document, generating a populated digital document notification. Further, the series of acts 900 can include an act of providing for display on an interface of the client device, the populated digital document notification, wherein the populated digital document notification includes one or more selectable options.

Additionally, in some implementations, the series of acts 900 can include an act of receiving, from the client device, an interaction with one or more selectable options of the populated digital document notification, and an act of, based on the interaction, providing for display on the interface of the client device, the populated digital document.

In one or more cases, the series of acts 900 can include an act of generating a session object corresponding to the fillable digital document, wherein the session object represents one or more instances of the fillable digital document, and an act of associating the one or more source content items with the data relevant to the one or more instances of the fillable digital document with the session object.

Additionally, in one or more embodiments, the series of acts 900 can include an act of locating the one or more source content items from a repository of source content items of a user mapped to the session object. The series of acts 900 can also include an act of processing, utilizing the large language model, the one or more source content items mapped to the session object by determining an aggregated field topic for the aggregated data field and a source content topic for data within a source content item from among the one or more source content items and comparing the aggregated field topic and the source content topic.

In some implementations, the series of acts 900 can include an act of processing the one or more source content items for the user account of the content management system by: generating, utilizing a content source summarization model, a summary of the source content item and a summary of the fillable digital document; and determining, utilizing the large language model, the relation between the source content item and the fillable digital document by comparing the summary of the source content item and the summary of the fillable digital document.

Moreover, in one or more embodiments, the series of acts 900 can include an act of receiving, from a client device, a user interaction requesting population of one or more aggregated data fields in a fillable digital document. The series of acts 900 can also include an act of, based on the user interaction, determining data relevant to the one or more aggregated data fields in the fillable digital document by utilizing a large language model to process one or more source content items for a user account of a content management system. Additionally, the series of acts 900 can include an act of generating, from the data relevant to an aggregated data field from the one or more aggregated data fields, a field object corresponding to the aggregated data field. Further, the series of acts 900 can include an act of modifying the fillable digital document to include the field object corresponding to the aggregated data field.

Furthermore, in some embodiments, the series of acts 900 can include an act of generating, utilizing the large language model, a computer code segment defining the data relevant to the one or more aggregated data fields from the one or more source content items, and an act of combining the data relevant to the one or more aggregated data fields by utilizing an output de-hallucination model to process the computer code segment.

In addition, in some implementations, the series of acts 900 can include an act of generating a populated digital document by pre-populating the one or more aggregated data fields in the fillable digital document. The series of acts 900 can also include an act of, based on generating the populated digital document, generate a populated digital document notification. Additionally, the series of acts 900 can include an act of providing, for display on an interface of the client device, the populated digital document notification, wherein the populated digital document notification includes one or more selectable options. The series of acts 900 can also include an act of receiving, from the client device, a selection of the one or more selectable options of the populated digital document notification. Further, the series of acts 900 can include an act of, based on the selection, provide for display on the interface of the client device, the populated digital document.

Moreover, in one or more embodiments, the series of acts 900 can include an act of determining data relevant to the one or more aggregated data fields by generating a session object corresponding to one or more instances of the fillable digital document, an act of mapping the one or more source content items associated with the one or more instances of the fillable digital document to the session object, and an act of pulling the one or more source content items from the user account of the content management system.

In addition, in some implementations, the series of acts 900 can include an act of locating the one or more source content items mapped to the session object. The series of acts 900 can also include an act of generating, utilizing a content source summarization model, summaries of the one or more source content items mapped to the session object, and an act of comparing the summaries of the one or more source content items mapped to the session object with the one or more aggregated data fields.

The components of the field object generation system 106 can include software, hardware, or both. For example, the components of the field object generation system 106 can include one or more instructions stored on a computer-readable storage medium and executable by processors of one or more computing devices. When executed by one or more processors, the computer-executable instructions of the field object generation system 106 can cause a computing device to perform the methods described herein. Alternatively, the components of the field object generation system 106 can comprise hardware, such as a special purpose processing device to perform a certain function or group of functions. Additionally or alternatively, the components of the field object generation system 106 can include a combination of computer-executable instructions and hardware.

Furthermore, the components of the field object generation system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the field object generation system 106 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
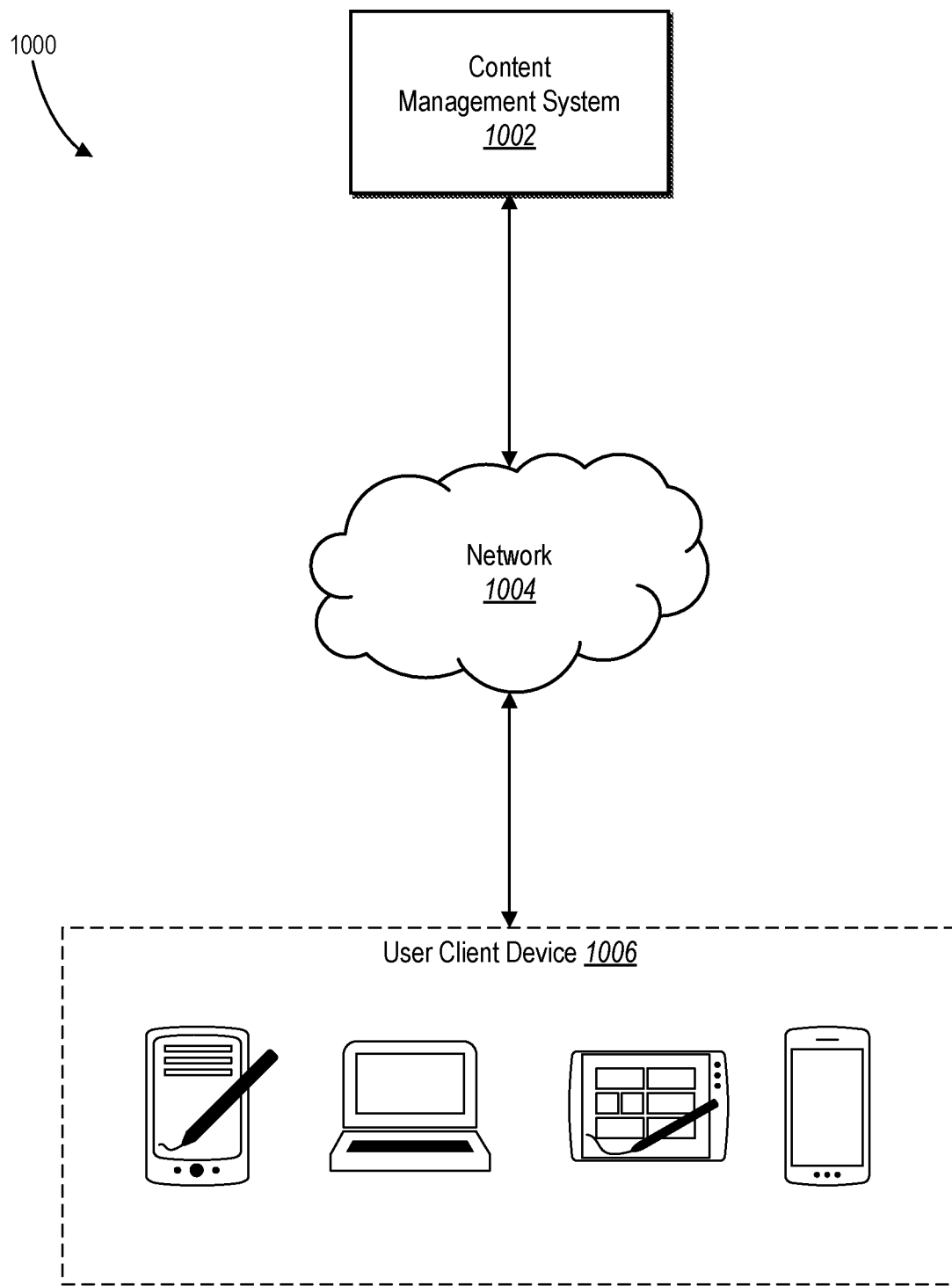
FIG. 10 illustrates a block diagram of an exemplary computing device (e.g., the server(s) and/or the client device) that may be configured to perform one or more of the processes described in accordance with one or more embodiments.

FIG. 10 illustrates a block diagram of exemplary computing device 1000 (e.g., the server(s) 102 and/or the client device 110) that may be configured to perform one or more of the processes described above. One will appreciate that server(s) 102 and/or the client device 110 may comprise one or more computing devices such as computing device 1000. As shown by FIG. 10, computing device 1000 can comprise processor 1002, memory 1004, storage device 1006, I/O interface 1108, and communication interface 1110, which may be communicatively coupled by way of communication infrastructure 1112. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1000. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1000 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1000 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
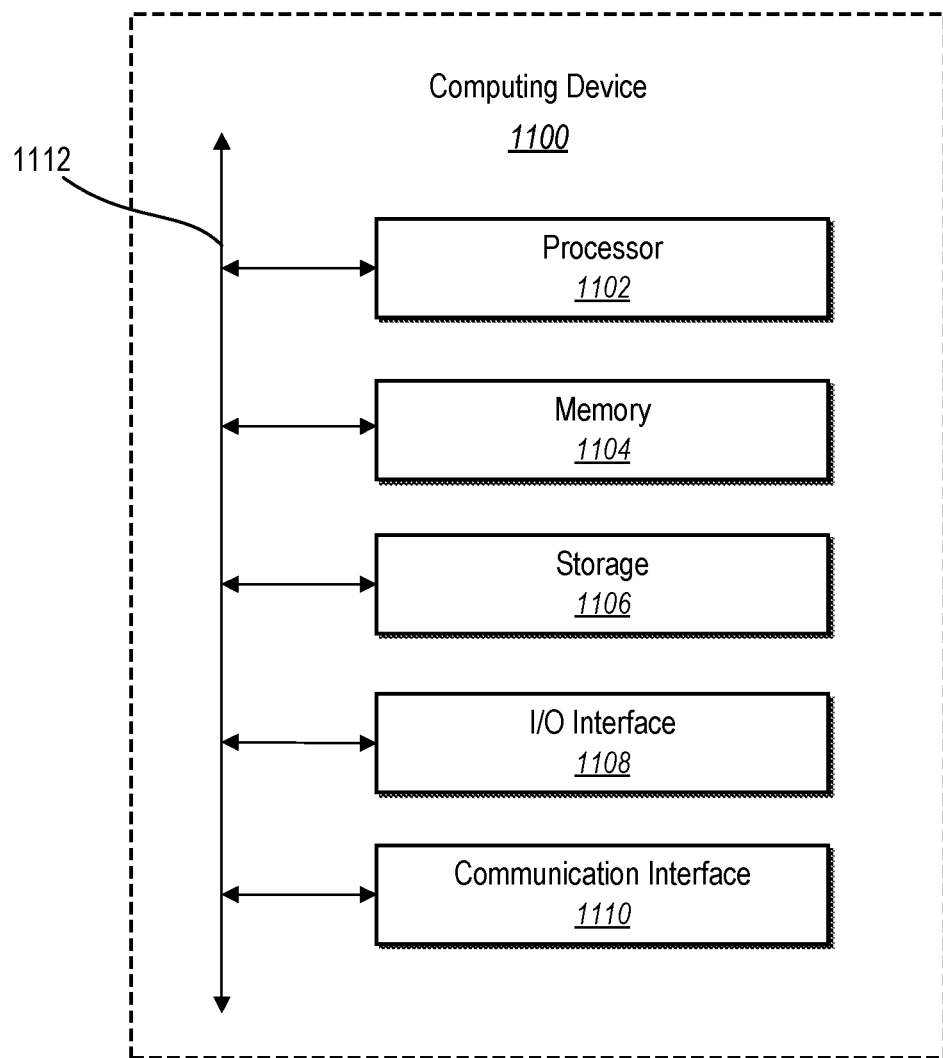
FIG. 11 illustrates a schematic diagram illustrating an exemplary environment within which one or more implementations of the field object generation system can be implemented in accordance with one or more embodiments.

FIG. 11 is a schematic diagram illustrating environment 1100 within which one or more implementations of the field object generation system 106 can be implemented. For example, the field object generation system 106 may be part of a content management system 1102 (e.g., the content management system 104). Content management system 1102 may generate, store, manage, receive, and send digital content (such as digital content items). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full-or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in-or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
receiving, from a client device, a user interaction requesting population of one or more aggregated data fields in a fillable digital document;
based on the user interaction, selecting, from among a repository of source content items associated with a user account of a content management system, one or more source content items based on relevance to the fillable digital document;
determining, utilizing a large language model to process the one or more source content items for the user account of the content management system by determining that data within the one or more source content items corresponds to the one or more aggregated data fields in the fillable digital document, data relevant to the one or more aggregated data fields in the fillable digital document;

generating a field object from the data relevant to an aggregated data field from the one or more aggregated data fields; and modifying the fillable digital document to include the field object.

2. The method of claim 1, wherein generating the field object comprises:

utilizing the large language model to generate a computer code segment defining the data relevant to the one or more aggregated data fields from the one or more source content items; and combining the data relevant to the one or more aggregated data fields by utilizing an output de-hallucination model to process the computer code segment.

3. The method of claim 1, wherein determining the data relevant to the one or more aggregated data fields further comprises:

extracting an aggregated data field vector corresponding to the aggregated data field and a source content item vector of a source content item; and comparing the aggregated data field vector and the source content item vector.

4. The method of claim 1, wherein determining the data within the one or more source content items that corresponds to the one or more aggregated data fields in the fillable digital document comprises:

determining an aggregated field topic for the aggregated data field and a source content topic for data within a source content item from among the one or more source content items; and comparing the aggregated field topic and the source content topic.

5. The method of claim 1, wherein determining data within the one or more source content items that corresponds to the one or more aggregated data fields in the fillable digital document further comprises:

determining a subject matter of the one or more source content items and the one or more aggregated data fields;

comparing the subject matter of the one or more source content items and the one or more aggregated data fields; and based on comparing the subject matter of the one or more source content items and the one or more aggregated data fields, determining the data relevant to the one or more aggregated data fields.

6. The method of claim 5, wherein comparing, utilizing the large language model, the subject matter of the one or more source content items and the one or more aggregated data fields further comprises:

generating, utilizing a content source summarization model, a source content item summary of a source content item for a user account of a content management system and an aggregated data field summary of the aggregated data field in the fillable digital document; and comparing the source content item summary and the aggregated data field summary.

7. The method of claim 1, wherein determining the data relevant to the one or more aggregated data fields in the fillable digital document further comprises:

generating a session object corresponding to the fillable digital document, wherein the session object represents one or more unique instances of the fillable digital document; and associating the one or more source content items with the session object.

8. A system comprising:

at least one processor; and a non-transitory computer readable medium comprising instructions that, when executed by the at least one processor, cause the system to:

receive, from a client device, a user interaction requesting population of one or more aggregated data fields in a fillable digital document;

based on the user interaction, select, from among a repository of source content items associated with a user account of a content management system, one or more source content items based on relevance to the fillable digital document;

determine, utilizing a large language model to process the one or more source content items for the user account of the content management system by determining that data within the one or more source content items corresponds to the one or more aggregated data fields in the fillable digital document, data relevant to the one or more aggregated data fields in the fillable digital document;

generate a field object from the data relevant to an aggregated data field from the one or more aggregated data fields; and populate the aggregated data field with the field object.

9. The system of claim 8, further comprising instructions that, when executed by the at least one processor, cause the system to generate the field object by:

utilizing the large language model to extract intermediate data objects from the data relevant to the one or more aggregated data fields; and combining the intermediate data objects into the field object utilizing an output de-hallucination model.

10. The system of claim 8, further comprising instructions that, when executed by the at least one processor, cause the system to:

generate a session object corresponding to the fillable digital document, wherein the session object represents one or more instances of the fillable digital document; and associate the one or more source content items with data relevant to the one or more instances of the fillable digital document with the session object.

11. The system of claim 8, further comprising instructions that, when executed by the at least one processor, cause the system to:

generate a populated digital document by pre-populating the one or more aggregated data fields in the fillable digital document;

based on generating the populated digital document, generate a populated digital document notification; and provide for display on an interface of the client device, the populated digital document notification, wherein the populated digital document notification includes one or more selectable options.

12. The system of claim 11, further comprising instructions that, when executed by the at least one processor, cause the system to:

receive, from the client device, an interaction with one or more selectable options of the populated digital document notification; and based on the interaction, provide for display on the interface of the client device, the populated digital document.

13. The system of claim 8, further comprising instructions that, when executed by the at least one processor, cause the system to:
generate a session object corresponding to the fillable digital document, wherein the session object represents one or more instances of the fillable digital document; and
associate the one or more source content items with the data relevant to the one or more instances of the fillable digital document with the session object.

14. The system of claim 13, further comprising instructions that, when executed by the at least one processor, cause the system to:
locate the one or more source content items from a repository of source content items of a user mapped to the session object; and
process, utilizing the large language model, the one or more source content items mapped to the session object by:
determining an aggregated field topic for the aggregated data field and a source content topic for data within a source content item from among the one or more source content items; and
comparing the aggregated field topic and the source content topic.

15. The system of claim 8, further comprising instructions that, when executed by the at least one processor, cause the system to process the one or more source content items for the user account of the content management system by:
generating, utilizing a content source summarization model, a summary of a source content item and a summary of the fillable digital document; and
determining, utilizing the large language model, a relation between the source content item and the fillable digital document by comparing the summary of the source content item and the summary of the fillable digital document.

16. A non-transitory computer readable medium comprising instructions that, when executed by at least one processor, cause the at least one processor to:
receive, from a client device, a request to populate one or more aggregated data fields in a fillable digital document;
based on the request, determine data relevant to the one or more aggregated data fields in the fillable digital document by utilizing a large language model to process one or more source content items for a user account of a content management system by determining that data within the one or more source content items corresponds to the one or more aggregated data fields in the fillable digital document;
generate, from the data relevant to an aggregated data field from the one or more aggregated data fields, a field object corresponding to the aggregated data field; and
modify the fillable digital document to include the field object corresponding to the aggregated data field.

17. The non-transitory computer readable medium of claim 16, wherein generating the field object comprises further comprising instructions that, when executed by the at least one processor, cause the at least one processor to:
generate, utilizing the large language model, a computer code segment defining the data relevant to the one or more aggregated data fields from the one or more source content items; and
combine the data relevant to the one or more aggregated data fields by utilizing an output de-hallucination model to process the computer code segment.

18. The non-transitory computer readable medium of claim 16, further comprising instructions that, when executed by the at least one processor, cause the at least one processor to:
generate a populated digital document by pre-populating the one or more aggregated data fields in the fillable digital document;
based on generating the populated digital document, generate a populated digital document notification;
provide for display on an interface of the client device, the populated digital document notification, wherein the populated digital document notification includes one or more selectable options;
receive, from the client device, a selection of the one or more selectable options of the populated digital document notification; and
based on the selection provide the populated digital document for display on the interface of the client device.

19. The non-transitory computer readable medium of claim 16, further comprising instructions that, when executed by the at least one processor, cause the at least one processor to determine data relevant to the one or more aggregated data fields by:
generating a session object corresponding to one or more instances of the fillable digital document;
mapping the one or more source content items associated with the one or more instances of the fillable digital document to the session object; and
pulling the one or more source content items from the user account of the content management system.

20. The non-transitory computer readable medium of claim 19, further comprising instructions that, when executed by the at least one processor, cause the at least one processor to:
locate the one or more source content items mapped to the session object;
generate, utilizing a content source summarization model, summaries of the one or more source content items mapped to the session object; and
compare the summaries of the one or more source content items mapped to the session object with the one or more aggregated data fields.

* * * * *